United States Patent
Lu et al.

(10) Patent No.: US 10,958,329 B2
(45) Date of Patent: Mar. 23, 2021

(54) DATA TRANSMISSION METHOD, TERMINAL DEVICE, AND NETWORK DEVICE

(71) Applicant: Huawei Technologies Co., Ltd., Shenzhen (CN)

(72) Inventors: Yawei Lu, Shenzhen (CN); Peng Zhang, Shanghai (CN); Zhenfei Tang, Ottawa (CA); Jun Zhu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/564,402

(22) Filed: Sep. 9, 2019

(65) Prior Publication Data
US 2020/0007215 A1    Jan. 2, 2020

Related U.S. Application Data

(63) Continuation of application No. PCT/CN2018/077082, filed on Feb. 24, 2018.

(30) Foreign Application Priority Data

Mar. 30, 2017 (CN) .......................... 201710203278.2

(51) Int. Cl.
   *H04B 7/06* (2006.01)
(52) U.S. Cl.
   CPC ................. *H04B 7/0632* (2013.01)
(58) Field of Classification Search
   CPC .. H04B 7/0632; H04B 7/0641; H04B 7/0626; H04L 1/0026
   See application file for complete search history.

(56) References Cited

U.S. PATENT DOCUMENTS 9,247,550 B2    1/2016 Kim
2008/0095185 A1*  4/2008 DiGirolamo ........ H04W 72/085
                                                                370/464
(Continued)

FOREIGN PATENT DOCUMENTS

CN       1452417      10/2003
CN      101018387 A    8/2007
(Continued)

OTHER PUBLICATIONS

3GPP TR 38.913, V14.2.0 (Mar. 2017), 3rd Generation Partnership Project; Technical Specification Group Radio Access Network; Study on Scenarios and Requirements for Next Generation Access Technologies; (Release 14), dated Mar. 24, 2019, 38 pages.

*Primary Examiner* — Sophia Vlahos
(74) *Attorney, Agent, or Firm* — Slater Matsil, LLP

(57) ABSTRACT

This application provides a data transmission method, a terminal device, and a network device. The method includes: sending, by a terminal device, first information to a network device, where the first information is used to indicate a first channel quality indicator (CQI) corresponding to a first block error rate; and sending, by the terminal device, second information to the network device by using radio resource control (RRC) signaling or media access control (MAC) signaling, where the second information is used to indicate a difference between the first CQI and a second CQI, the second CQI is a CQI corresponding to a second block error rate, and the first block error rate is greater than the second block error rate.

18 Claims, 10 Drawing Sheets

(56) References Cited

U.S. PATENT DOCUMENTS

| | | |
|---|---|---|
| 2009/0287970 A1 | 11/2009 | Iizuka et al. |
| 2010/0067396 A1* | 3/2010 | Cui .................. H04W 28/0205 |
| | | 370/252 |
| 2010/0098045 A1* | 4/2010 | Miyazaki ............. H04L 1/0033 |
| | | 370/342 |
| 2011/0080968 A1* | 4/2011 | Seo ..................... H04B 7/0632 |
| | | 375/267 |
| 2012/0314588 A1* | 12/2012 | Nammi ................ H04L 1/0027 |
| | | 370/252 |
| 2014/0029454 A1* | 1/2014 | Yu ........................... H04L 1/203 |
| | | 370/252 |
| 2014/0044044 A1 | 2/2014 | Josiam et al. |
| 2014/0098697 A1* | 4/2014 | Wang .................. H04W 24/02 |
| | | 370/252 |
| 2014/0369262 A1 | 12/2014 | Roh et al. |
| 2015/0098342 A1 | 4/2015 | Tabet et al. |
| 2015/0365212 A1* | 12/2015 | Nammi ................ H04W 16/32 |
| | | 370/329 |
| 2016/0262167 A1* | 9/2016 | Lan ....................... H04L 1/0025 |
| 2017/0141903 A1* | 5/2017 | Xu ........................ H04L 1/0035 |
| 2020/0007270 A1* | 1/2020 | Wikstrom ......... H04W 72/0413 |
| 2020/0169902 A1* | 5/2020 | Yasukawa ............ H04W 28/18 |

FOREIGN PATENT DOCUMENTS

| | | |
|---|---|---|
| CN | 101420289 A | 4/2009 |
| CN | 101568146 A | 10/2009 |
| CN | 101073284 B | 5/2010 |
| CN | 101772046 A | 7/2010 |
| CN | 102265543 A | 11/2011 |
| CN | 103297179 A | 9/2013 |
| CN | 103873217 A | 6/2014 |
| CN | 104412639 A | 3/2015 |
| CN | 104868977 A | 8/2015 |
| CN | 105991235 A | 10/2016 |
| CN | 106304377 A | 1/2017 |
| WO | 2015165514 A1 | 11/2015 |
| WO | WO2016/174527 | * 11/2016 |

* cited by examiner

| Transmission mode 1 | | | | | | | | Transmission mode 2 | | | | | | | |
|---|---|---|---|---|---|---|---|---|---|---|---|---|---|---|---|
| Quantity 1 of receive antenna ports | | | | Quantity 2 of receive antenna ports | | | | Quantity 1 of receive antenna ports | | | | Quantity 2 of receive antenna ports | | | |
| Doppler frequency shift 1 | | Doppler frequency shift 2 | | Doppler frequency shift 1 | | Doppler frequency shift 2 | | Doppler frequency shift 1 | | Doppler frequency shift 2 | | Doppler frequency shift 1 | | Doppler frequency shift 2 | |
| SNR 1 | SNR 2 | SNR 1 | SNR 2 | SNR 1 | SNR 2 | SNR 1 | SNR 2 | SNR 1 | SNR 2 | SNR 1 | SNR 2 | SNR 1 | SNR 2 | SNR 1 | SNR 2 |
| ΔCQI 1 | ΔCQI 2 | ΔCQI 3 | ΔCQI 4 | ΔCQI 5 | ΔCQI 6 | ΔCQI 7 | ΔCQI 8 | ΔCQI 9 | ΔCQI 10 | ΔCQI 11 | ΔCQI 12 | ΔCQI 13 | ΔCQI 14 | ΔCQI 15 | ΔCQI 16 |

FIG. 7

DATA TRANSMISSION METHOD, TERMINAL DEVICE, AND NETWORK DEVICE

CROSS-REFERENCE TO RELATED APPLICATIONS

This application is a continuation of International Application No. PCT/CN2018/077082, filed on Feb. 24, 2018, which claims priority to Chinese Patent Application No. 201710203278.2, filed on Mar. 30, 2017. The disclosures of the aforementioned applications are hereby incorporated by reference in their entireties.

TECHNICAL FIELD

This application relates to communications technologies, and in particular, to a data transmission method, a terminal device, and a network device.

BACKGROUND

An ultra-reliable and low latency communications (URLLC) service is an important service in a 5G communications system, and requires very high reliability and a very short latency during transmission. Therefore, to ensure reliability of the URLLC service, a hybrid automatic repeat request (HARQ) technology is allowed to be used during transmission of URLLC service data in the 5G communications system. To be specific, after sending the URLLC service data (including one or more data packets) to a receiver, a transmitter retransmits, to the receiver based on a negative message that is fed back by the receiver and that is used to indicate that one or more data packets fail to be sent, the data packets that fail to be sent, to reduce a probability that the URLLC service data fails to be sent.

Currently, a terminal device may report, to a base station, a channel quality indicator (CQI) that can reflect quality of a current channel. In this way, after receiving the CQI, the base station may determine, by using the CQI, a modulation and coding scheme (MCS) used when sending data to the terminal device. In a same channel quality condition, a smaller CQI fed back by the terminal device indicates higher transmission reliability and a lower block error rate when the base station transmits data by using the MCS corresponding to the CQI. Therefore, after obtaining quality of a current channel between the terminal device and the base station, the terminal device may determine, based on a block error rate corresponding to a reliability requirement of a current service, a CQI to be reported to the base station.

Because an MCS determined by a base station based on a smaller CQI is also lower, when the base station initially transmits and retransmits URLLC service data, by using the MCS, a relatively large quantity of spectrum resources are occupied during initial data transmission and data retransmission, thereby resulting in relatively low spectrum resource utilization. Therefore, how to improve frequency resource utilization during transmission of the URLLC service data while meeting reliability of a URLLC service is an urgent problem to be resolved.

SUMMARY

This application provides a data transmission method, a terminal device, and a network device, to resolve a prior-art technical problem of how to improve frequency resource utilization during transmission of URLLC service data while meeting reliability of a URLLC service.

According to a first aspect, this application provides a data transmission method. The method includes: sending, by a terminal device, first information to a network device, where the first information is used to indicate a first channel quality indicator CQI corresponding to a first block error rate; and sending, by the terminal device, second information to the network device by using radio resource control RRC signaling or media access control MAC signaling, where the second information is used to indicate a difference between the first CQI and a second CQI, the second CQI is a CQI corresponding to a second block error rate, and the first block error rate is greater than the second block error rate.

According to the data transmission method provided in the first aspect, the terminal device sends, to the network device, the first information used to indicate the first CQI and the second information used to indicate the difference between the first CQI and the second CQI, so that the network device can obtain the first CQI and the second CQI that have different BLERs, and the network device can determine, based on reliability and latency requirements of a currently transmitted service of the terminal device, CQIs respectively used during initial data transmission and data retransmission, to transmit service data by using as few spectrum resources as possible while ensuring the reliability and latency requirements of the currently transmitted service of the terminal device, thereby improving spectrum resource utilization.

In a possible design, the second information includes the difference between the first CQI and the second CQI.

In a possible design, the second information includes a transmission parameter currently used by the terminal device, and the transmission parameter is in a one-to-one correspondence with the difference between the first CQI and the second CQI.

In a possible design, the transmission parameter includes one or more of the following: a reliability indicator of a currently transmitted service, a transmission mode, a quantity of receive antenna ports, a Doppler frequency shift, and a signal-to-noise ratio.

In a possible design, before the sending, by the terminal device, second information to the network device by using radio resource control RRC signaling or media access control MAC signaling, the method further includes: sending, by the terminal device, third information to the network device, where the third information is used to indicate the correspondence between the transmission parameter and the difference between the first CQI and the second CQI.

In a possible design, the sending, by the terminal device, second information to the network device by using radio resource control RRC signaling or media access control MAC signaling includes: when the transmission parameter of the terminal device changes, sending, by the terminal device, the second information to the network device by using the RRC signaling or the MAC signaling.

According to the data transmission method provided in the possible design, uplink resource overheads can be reduced while it is ensured that the network device can obtain the first information and the second information.

In a possible design, a sending period of the second information is greater than or equal to a sending period of the first information.

According to the data transmission method provided in the possible design, uplink resource overheads can be reduced while it is ensured that the network device can obtain the first information and the second information.

According to a second aspect, this application provides a data transmission method. The method includes: receiving, by a network device, first information sent by a terminal device, where the first information is used to indicate a first channel quality indicator CQI corresponding to a first block error rate; and receiving, by the network device, second information sent by the terminal device by using radio resource control RRC signaling or media access control MAC signaling, where the second information is used to indicate a difference between the first CQI and a second CQI, the second CQI is a CQI corresponding to a second block error rate, and the first block error rate is greater than the second block error rate.

According to the data transmission method provided in the second aspect, the network device receives the first information that is sent by the terminal device and that is used to indicate the first CQI and the second information that is sent by the terminal device and that is used to indicate the difference between the first CQI and the second CQI, so that the network device can obtain the first CQI and the second CQI that have different BLERs, and the network device can determine, based on reliability and latency requirements of a currently transmitted service of the terminal device, CQIs respectively used during initial data transmission and data retransmission, to transmit service data by using as few spectrum resources as possible while ensuring the reliability and latency requirements of the currently transmitted service of the terminal device, thereby improving spectrum resource utilization.

In a possible design, after the receiving, by the network device, second information sent by the terminal device by using radio resource control RRC signaling or media access control MAC signaling, the method further includes: determining, by the network device, the second CQI based on the first information and the second information; and sending, by the network device, data to the terminal device based on the first CQI and the second CQI.

According to the data transmission method provided in the possible design, after obtaining the first CQI and the second CQI that have different BLERs, the network device can determine, based on reliability and latency requirements of a currently transmitted service of the terminal device, CQIs respectively used during initial data transmission and data retransmission, to transmit service data by using as few spectrum resources as possible while ensuring the reliability and latency requirements of the currently transmitted service of the terminal device, thereby improving spectrum resource utilization.

In a possible design, if the second information includes the difference between the first CQI and the second CQI, the determining, by the network device, the second CQI based on the first information and the second information includes: determining, by the network device, the second CQI based on the first CQI and the difference between the first CQI and the second CQI.

In a possible design, if the second information includes a transmission parameter currently used by the terminal device, and the transmission parameter is in a one-to-one correspondence with the difference between the first CQI and the second CQI, the determining, by the network device, the second CQI based on the first information and the second information includes: determining, by the network device, the difference between the first CQI and the second CQI based on the transmission parameter and the correspondence between the transmission parameter and the difference between the first CQI and the second CQI; and determining, by the network device, the second CQI based on the first CQI and the difference between the first CQI and the second CQI.

In a possible design, the transmission parameter includes one or more of the following: a reliability indicator of a currently transmitted service, a transmission mode, a quantity of receive antenna ports, a Doppler frequency shift, and a signal-to-noise ratio.

In a possible design, before the receiving, by the network device, second information sent by the terminal device by using radio resource control RRC signaling or media access control MAC signaling, the method further includes: receiving, by the network device, third information sent by the terminal device, where the third information is used to indicate the correspondence between the transmission parameter and the difference between the first CQI and the second CQI.

In a possible design, the sending, by the network device, data to the terminal device based on the first CQI and the second CQI includes: after initially transmitting data to the terminal device by using a first modulation and coding scheme MCS corresponding to the first CQI, retransmitting, by the network device when a difference between a largest latency allowed by the terminal device and a current latency is greater than a first preset threshold, the data to the terminal device by using the first MCS, or retransmitting, by the network device when a difference between a largest latency allowed by the terminal device and a current latency is less than or equal to a preset threshold, the data to the terminal device by using a second MCS corresponding to the second CQI.

According to the data transmission method provided in the possible design, spectrum resource utilization can be further improved while reliability and latency requirements of a currently transmitted service of the terminal device are ensured.

In a possible design, the sending, by the network device, data to the terminal device based on the first CQI and the second CQI includes: when a largest latency allowed by the terminal device is less than or equal to a second preset threshold, initially transmitting and retransmitting, by the network device, data to the terminal device, by using a second MCS corresponding to the second CQI.

According to the data transmission method provided in the possible design, reliability and latency requirements of a currently transmitted service of the terminal device can be ensured.

According to a third aspect, this application provides a data transmission method. The method includes: sending, by a terminal device, first information to a network device, where the first information is used to indicate a first maximum quantity of retransmissions that is corresponding to a first block error rate; and sending, by the terminal device, second information to the network device, where the second information is used to indicate a difference between the first maximum quantity of retransmissions and a second maximum quantity of retransmissions, the second maximum quantity of retransmissions is a maximum quantity of retransmissions that is corresponding to a second block error rate, and the first block error rate is greater than the second block error rate.

According to the data transmission method provided in the third aspect, the terminal device sends, to the network device, the first information used to indicate the first maximum quantity of retransmissions and the second information used to indicate the difference between the first maximum quantity of retransmissions and the second maximum quantity of retransmissions, so that the network device can obtain the second maximum quantity of retransmissions, and the network device can retransmit data to the terminal device based on the second maximum quantity of retransmissions, to shorten a data sending latency while ensuring reliability of a currently transmitted service of the terminal device.

According to a fourth aspect, this application provides a terminal device. The terminal device includes a processing module and a sending module, the sending module is coupled to the processing module, and the processing module controls a sending action of the sending module.

The sending module is configured to send first information to a network device, where the first information is used to indicate a first channel quality indicator CQI corresponding to a first block error rate.

The sending module is further configured to send second information to the network device by using radio resource control RRC signaling or media access control MAC signaling, where the second information is used to indicate a difference between the first CQI and a second CQI, the second CQI is a CQI corresponding to a second block error rate, and the first block error rate is greater than the second block error rate.

In a possible design, the second information includes the difference between the first CQI and the second CQI.

In a possible design, the second information includes a transmission parameter currently used by the terminal device, and the transmission parameter is in a one-to-one correspondence with the difference between the first CQI and the second CQI.

In a possible design, the transmission parameter includes one or more of the following: a reliability indicator of a currently transmitted service, a transmission mode, a quantity of receive antenna ports, a Doppler frequency shift, and a signal-to-noise ratio.

In a possible design, the sending module is further configured to: before sending the second information to the network device by using the radio resource control RRC signaling or the media access control MAC signaling, send third information to the network device, where the third information is used to indicate the correspondence between the transmission parameter and the difference between the first CQI and the second CQI.

In a possible design, the processing module is specifically configured to: when the transmission parameter of the terminal device changes, instruct the sending module to send the second information to the network device by using the RRC signaling or the MAC signaling.

In a possible design, a sending period of the second information is greater than or equal to a sending period of the first information.

For beneficial effects of the terminal device provided in the fourth aspect and the possible designs of the fourth aspect, refer to the beneficial effects brought by the first aspect and the possible designs of the first aspect. Details are not described herein again.

According to a fifth aspect, this application provides a network device. The network device includes a processing module and a receiving module, the receiving module is coupled to the processing module, and the processing module controls a receiving action of the receiving module.

The receiving module is configured to receive first information sent by a terminal device, where the first information is used to indicate a first channel quality indicator CQI corresponding to a first block error rate.

The receiving module is further configured to receive second information sent by the terminal device by using radio resource control RRC signaling or media access control MAC signaling, where the second information is used to indicate a difference between the first CQI and a second CQI, the second CQI is a CQI corresponding to a second block error rate, and the first block error rate is greater than the second block error rate.

In a possible design, the network device further includes a sending module.

The processing module is configured to: after the receiving module receives the second information sent by the terminal device by using the radio resource control RRC signaling or the media access control MAC signaling, determine the second CQI based on the first information and the second information, and instruct, based on the first CQI and the second CQI, the sending module to send data to the terminal device.

In a possible design, if the second information includes the difference between the first CQI and the second CQI, the processing module is specifically configured to determine the second CQI based on the first CQI and the difference between the first CQI and the second CQI.

In a possible design, if the second information includes a transmission parameter currently used by the terminal device, and the transmission parameter is in a one-to-one correspondence with the difference between the first CQI and the second CQI, the processing module is specifically configured to: determine the difference between the first CQI and the second CQI based on the transmission parameter and the correspondence between the transmission parameter and the difference between the first CQI and the second CQI, and determine the second CQI based on the first CQI and the difference between the first CQI and the second CQI.

In a possible design, the transmission parameter includes one or more of the following: a reliability indicator of a currently transmitted service, a transmission mode, a quantity of receive antenna ports, a Doppler frequency shift, and a signal-to-noise ratio.

In a possible design, the receiving module is further configured to: before receiving the second information sent by the terminal device by using the radio resource control RRC signaling or the media access control MAC signaling, receive third information sent by the terminal device, where the third information is used to indicate the correspondence between the transmission parameter and the difference between the first CQI and the second CQI.

In a possible design, the processing module is specifically configured to: after instructing the sending module to initially transmit data to the terminal device by using a first modulation and coding scheme MCS corresponding to the first CQI, instruct, when a difference between a largest latency allowed by the terminal device and a current latency is greater than a first preset threshold, the sending module to retransmit the data to the terminal device by using the first MCS, or instruct, when a difference between a largest latency allowed by the terminal device and a current latency is less than or equal to a preset threshold, the sending module to retransmit the data to the terminal device by using a second MCS corresponding to the second CQI.

In a possible design, the processing module is specifically configured to: when a largest latency allowed by the terminal device is less than or equal to a second preset threshold, instruct the sending module to initially transmit and retransmit data to the terminal device, by using a second MCS corresponding to the second CQI.

For beneficial effects of the network device provided in the fifth aspect and the possible designs of the fifth aspect, refer to the beneficial effects brought by the second aspect and the possible designs of the second aspect. Details are not described herein again.

According to a sixth aspect, this application provides a terminal device. The terminal device includes a processing module and a sending module, the sending module is coupled to the processing module, and the processing module controls a sending action of the sending module.

The sending module is configured to send first information to a network device, where the first information is used to indicate a first maximum quantity of retransmissions that is corresponding to a first block error rate.

The sending module is further configured to send second information to the network device, where the second information is used to indicate a difference between the first maximum quantity of retransmissions and a second maximum quantity of retransmissions, the second maximum quantity of retransmissions is a maximum quantity of retransmissions that is corresponding to a second block error rate, and the first block error rate is greater than the second block error rate.

For beneficial effects of the terminal device provided in the sixth aspect and the possible designs of the sixth aspect, refer to the beneficial effects brought by the third aspect and the possible designs of the third aspect. Details are not described herein again.

According to a seventh aspect, this application provides a terminal device. The terminal device includes a processor and a transmitter, the transmitter is coupled to the processor, and the processor controls a sending action of the transmitter.

The transmitter is configured to send first information to a network device, where the first information is used to indicate a first channel quality indicator CQI corresponding to a first block error rate.

The transmitter is further configured to send second information to the network device by using radio resource control RRC signaling or media access control MAC signaling, where the second information is used to indicate a difference between the first CQI and a second CQI, the second CQI is a CQI corresponding to a second block error rate, and the first block error rate is greater than the second block error rate.

In a possible design, the second information includes the difference between the first CQI and the second CQI.

In a possible design, the second information includes a transmission parameter currently used by the terminal device, and the transmission parameter is in a one-to-one correspondence with the difference between the first CQI and the second CQI.

In a possible design, the transmission parameter includes one or more of the following: a reliability indicator of a currently transmitted service, a transmission mode, a quantity of receive antenna ports, a Doppler frequency shift, and a signal-to-noise ratio.

In a possible design, the transmitter is further configured to: before sending the second information to the network device by using the radio resource control RRC signaling or the media access control MAC signaling, send third information to the network device, where the third information is used to indicate the correspondence between the transmission parameter and the difference between the first CQI and the second CQI.

In a possible design, the processor is configured to: when the transmission parameter of the terminal device changes, instruct the transmitter to send the second information to the network device by using the RRC signaling or the MAC signaling.

In a possible design, a sending period of the second information is greater than or equal to a sending period of the first information.

For beneficial effects of the terminal device provided in the seventh aspect and the possible designs of the seventh aspect, refer to the beneficial effects brought by the first aspect and the possible designs of the first aspect. Details are not described herein again.

According to an eighth aspect, this application provides a network device. The network device includes a processor and a receiver, the receiver is coupled to the processor, and the processor controls a receiving action of the receiver.

The receiver is configured to receive first information sent by a terminal device, where the first information is used to indicate a first channel quality indicator CQI corresponding to a first block error rate.

The receiver is further configured to receive second information sent by the terminal device by using radio resource control RRC signaling or media access control MAC signaling, where the second information is used to indicate a difference between the first CQI and a second CQI, the second CQI is a CQI corresponding to a second block error rate, and the first block error rate is greater than the second block error rate.

In a possible design, the network device further includes a transmitter.

The processor is configured to: after the receiver receives the second information sent by the terminal device by using the radio resource control RRC signaling or the media access control MAC signaling, determine the second CQI based on the first information and the second information, and instruct, based on the first CQI and the second CQI, the transmitter to send data to the terminal device.

In a possible design, if the second information includes the difference between the first CQI and the second CQI, the processor is specifically configured to determine the second CQI based on the first CQI and the difference between the first CQI and the second CQI.

In a possible design, if the second information includes a transmission parameter currently used by the terminal device, and the transmission parameter is in a one-to-one correspondence with the difference between the first CQI and the second CQI, the processor is specifically configured to: determine the difference between the first CQI and the second CQI based on the transmission parameter and the correspondence between the transmission parameter and the difference between the first CQI and the second CQI, and determine the second CQI based on the first CQI and the difference between the first CQI and the second CQI.

In a possible design, the transmission parameter includes one or more of the following: a reliability indicator of a currently transmitted service, a transmission mode, a quantity of receive antenna ports, a Doppler frequency shift, and a signal-to-noise ratio.

In a possible design, the receiver is further configured to: before receiving the second information sent by the terminal device by using the radio resource control RRC signaling or the media access control MAC signaling, receive third information sent by the terminal device, where the third information is used to indicate the correspondence between the transmission parameter and the difference between the first CQI and the second CQI.

In a possible design, the processor is specifically configured to: after instructing the transmitter to initially transmit data to the terminal device by using a first modulation and coding scheme MCS corresponding to the first CQI, instruct, when a difference between a largest latency allowed by the terminal device and a current latency is greater than a first preset threshold, the transmitter to retransmit the data to the terminal device by using the first MCS, or instruct, when a difference between a largest latency allowed by the terminal device and a current latency is less than or equal to a preset threshold, the transmitter to retransmit the data to the terminal device by using a second MCS corresponding to the second CQI.

In a possible design, the processor is specifically configured to: when a largest latency allowed by the terminal device is less than or equal to a second preset threshold, instruct the transmitter to initially transmit and retransmit data to the terminal device, by using a second MCS corresponding to the second CQI.

For beneficial effects of the network device provided in the eighth aspect and the possible designs of the eighth aspect, refer to the beneficial effects brought by the second aspect and the possible designs of the second aspect. Details are not described herein again.

According to a ninth aspect, this application provides a terminal device. The terminal device includes a processor and a transmitter, the transmitter is coupled to the processor, and the processor controls a sending action of the transmitter.

The transmitter is configured to send first information to a network device, where the first information is used to indicate a first maximum quantity of retransmissions that is corresponding to a first block error rate.

The transmitter is further configured to send second information to the network device, where the second information is used to indicate a difference between the first maximum quantity of retransmissions and a second maximum quantity of retransmissions, the second maximum quantity of retransmissions is a maximum quantity of retransmissions that is corresponding to a second block error rate, and the first block error rate is greater than the second block error rate.

For beneficial effects of the terminal device provided in the ninth aspect and the possible designs of the ninth aspect, refer to the beneficial effects brought by the third aspect and the possible designs of the third aspect. Details are not described herein again.

A tenth aspect of this application provides a terminal device, including at least one processing element (or chip) configured to perform the method in the first aspect.

An eleventh aspect of this application provides a network device, including at least one processing element (or chip) configured to perform the method in the second aspect.

A twelfth aspect of this application provides a terminal device, including at least one processing element (or chip) configured to perform the method in the third aspect.

A thirteenth aspect of this application provides a program, and the program is used to perform the method in the first aspect when being executed by a processor.

A fourteenth aspect of this application provides a program, and the program is used to perform the method in the second aspect when being executed by a processor.

A fifteenth aspect of this application provides a program, and the program is used to perform the method in the third aspect when being executed by a processor.

A sixteenth aspect of this application provides a program product, for example, a computer readable storage medium, including the program in the thirteenth aspect.

A seventeenth aspect of this application provides a program product, for example, a computer readable storage medium, including the program in the fourteenth aspect.

An eighteenth aspect of this application provides a program product, for example, a computer readable storage medium, including the program in the fifteenth aspect.

A nineteenth aspect of this application provides a computer readable storage medium, and the computer readable storage medium stores an instruction. When running on a computer, the instruction enables the computer to perform the method in the first aspect.

A twentieth aspect of this application provides a computer readable storage medium, and the computer readable storage medium stores an instruction. When being running on a computer, the instruction enables the computer to perform the method in the second aspect.

A twenty-first aspect of this application provides a computer readable storage medium, and the computer readable storage medium stores an instruction. When being running on a computer, the instruction enables the computer to perform the method in the third aspect.

According to the data transmission method, the terminal device, and the network device that are provided in this application, the terminal device sends, to the network device, the first information used to indicate the first CQI and the second information used to indicate the difference between the first CQI and the second CQI, so that the network device can obtain the first CQI and the second CQI that have different BLERs, and the network device can determine, based on reliability and latency requirements of a currently transmitted service of the terminal device, CQIs respectively used during initial data transmission and data retransmission, to transmit service data by using as few spectrum resources as possible while ensuring the reliability and latency requirements of the currently transmitted service of the terminal device, thereby improving spectrum resource utilization.

BRIEF DESCRIPTION OF THE DRAWINGS

FIG. 7 shows a correspondence between a transmission parameter and $\Delta$CQI in this application;

DETAILED DESCRIPTION OF ILLUSTRATIVE EMBODIMENTS

The term "a plurality of" in this application refers to two or more than two. The term "and/or" describes an association relationship for describing associated objects and represents that three relationships may exist. For example, A and/or B may represent the following three cases: Only A exists, both A and B exist, and only B exists. The character "/" usually indicates an "or" relationship between the associated objects.

It should be understood that although terms "first" and "second" may be used in this application to describe CQIs, these CQIs should not be limited by these terms. These terms are merely used to distinguish between the CQIs. For example, without departing from the scope of the embodiments of the present invention, a first CQI may also be referred to as a second CQI, and similarly, the second CQI may also be referred to as the first CQI.

A URLLC service is an important service in a future 5G communications system, and requires very high reliability and a very short latency, for example, reliability of 99.999%, and a latency of 1 millisecond (ms). Currently, to ensure reliability of the URLLC service, a hybrid automatic repeat request (HARQ) technology is used during transmission of URLLC service data, to reduce, through initial transmission and retransmission, a probability that the URLLC service data fails to be sent.

Figure 1:
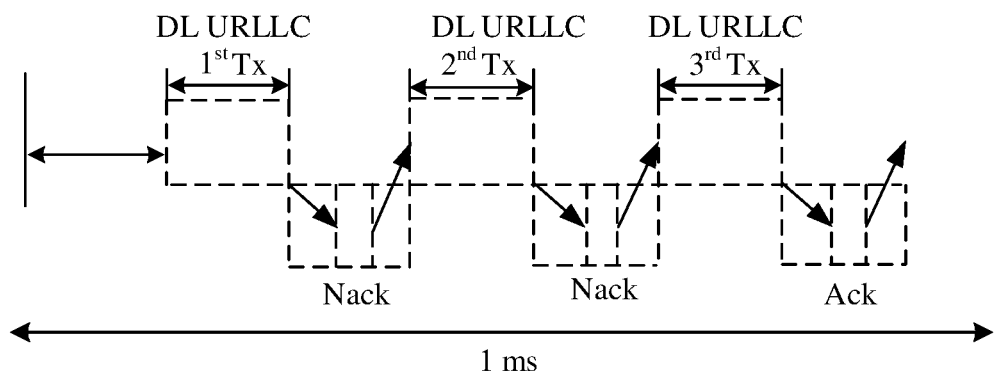
FIG. 1 is a schematic diagram of transmitting URLLC service data by using an HRAQ technology.

FIG. 1 is a schematic diagram of transmitting URLLC service data by using an HRAQ technology. As shown in FIG. 1, for example, a latency requirement of a URLLC service is 1 ms, and a base station sends the URLLC service data to a terminal device. During first transmission ($1^{st}$ TX) within 1 ms, namely, initial transmission, the base station may first send all of the URLLC service data to the terminal device. In this case, if the terminal device successfully receives a data packet transmitted during the $1^{st}$ TX, the terminal device may return an ACK message to the base station, to indicate, to the base station, that the terminal device has successfully received the sent data packet. If the terminal device fails to receive some data packets transmitted during the $1^{st}$ TX, the terminal device may send a Nack message to the base station, to indicate, to the base station, that the data packets fail to be sent. Then, the base station may perform second transmission ($2^{nd}$ TX), namely, retransmission based on the Nack message. To be specific, during the second transmission within 1 ms, the base station resends, to the terminal device, the data packets that fail to be sent and that are indicated by the Nack message. In this case, if the terminal device fails to receive the data packets transmitted during the $2^{nd}$ TX, the terminal device may send the Nack message to the base station, to indicate, to the base station, that the data packets fail to be sent. In this way, the base station may perform third transmission ($3^{rd}$ TX), namely, retransmission based on the Nack message, to resend, to the terminal device, the data packets that fail to be sent and that are indicated by the Nack message during the second sending, and so on, until the terminal device successfully receives the URLLC service data that is sent this time. It should be noted that although FIG. 1 is the schematic diagram of three times of transmitting the URLLC service data within 1 ms, this is not limited in this application.

In addition, in the foregoing example, although the base station performs retransmission based on the Nack message fed back by the terminal device, a person skilled in the art may understand that after the base station sends data to the terminal device at a time, if the base station does not receive, within preset duration, a Nack message or an Ack message sent by the terminal device, the base station also performs a retransmission action to retransmit all data packets that are sent last time.

In a long term evolution (LTE) communications system, a terminal device needs to report a CQI to a base station, to indicate quality of a current channel between the base station and the terminal device by using the CQI. After receiving the CQI, the base station may determine, by using the CQI, a modulation and coding scheme (MCS) used when sending data to the terminal device. In the prior art, in a same channel quality condition, values of CQIs corresponding to different block error rates (BLER) are different. A lower BLER indicates a smaller value of a CQI. A reliability indicator is 90% in the LTE communications system, in other words, a 10% block error rate (BLER) is allowed in the LTE communications system. In other words, 10% data packets that fail to be sent are allowed in data sent by a transmitter to a receiver each time. Therefore, in the LTE communications system, the terminal device reports the CQI, briefly referred to as a CQI (10%) in this application, corresponding to the 10% BLER to the base station.

In a 5G communications system, if a terminal device reports a CQI (10%) to a base station in a manner of reporting the CQI in the LTE communications system, in the foregoing process of initially transmitting and retransmitting the URLLC service data, when the base station encodes and transmits the URLLC service data, by using an MCS corresponding to the CQI (10%), a reliability indicator of a URLLC service cannot be met because a reliability indicator corresponding to the CQI (10%) is relatively low (the reliability indicator is 90%).

If the terminal device reports a CQI by using a BLER corresponding to the reliability indicator of the URLLC service, for example, the reliability indicator of the URLLC service is 99.9%, and the BLER corresponding to the reliability is 0.1%, in other words, if the terminal device reports the CQI, briefly referred to as a CQI (0.1%) in this application, corresponding to the 0.1% BLER to the base station, because a value of the CQI (0.1%) is less than a value of a CQI (10%) in a same channel quality condition, an MCS determined by the base station based on the CQI (0.1%) is less than an MCS determined by the base station based on the CQI (10%). When the base station encodes data by using the MCS, a lower MCS indicates a larger amount of encoded data and more occupied resources. Therefore, in the foregoing process of initially transmitting and retransmitting the URLLC service data, when the base station encodes and transmits the URLLC service data, by using the MCS corresponding to the CQI (0.1%), reliability of the URLLC service can be ensured, but spectrum resource utilization is relatively low.

Therefore, how to improve the frequency resource utilization during transmission of the URLLC service data while meeting the reliability of the URLLC service is an urgent problem to be resolved. Therefore, this application provides a data transmission method, to resolve a prior-art technical problem of how to improve frequency resource utilization during transmission of URLLC service data while meeting reliability of a URLLC service.

Figure 2:
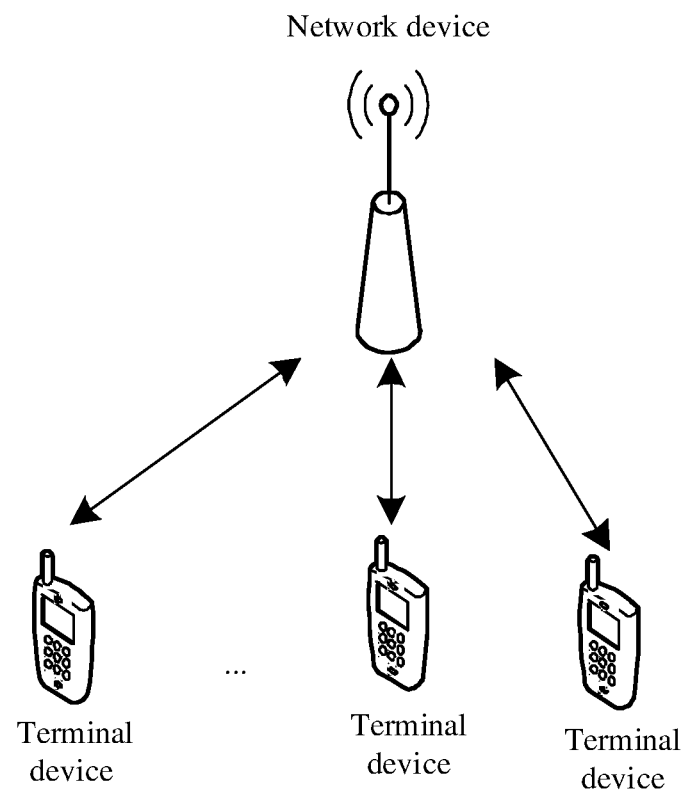
FIG. 2 is an architectural diagram of a communications system in this application.

FIG. 2 is an architectural diagram of a communications system in this application. The data transmission method provided in this application is applicable to the communications system shown in FIG. 2. The communications system may be an LTE communications system or another future communications system. This is not limited herein. As shown in FIG. 2, the communications system includes a network device and a terminal device. The network device and the terminal device may communicate with each other by using one or more air interface technologies to transmit URLLC service data.

The network device may be a base station or an access point, or may be a device that is in an access network and that communicates with a wireless terminal on an air interface by using one or more sectors. The base station may be configured to mutually convert a received over-the-air frame and an IP packet and serve as a router between the wireless terminal and a remaining part of the access network. The remaining part of the access network may include an Internet protocol (IP) network. The base station may further coordinate attribute management on the air interface. For example, the base station may be a global system for mobile communications (GSM) or a base transceiver station (BTS) in code division multiple access (CDMA), or may be a NodeB (NB) in wideband code division multiple access (WCDMA), or may be an evolved NodeB (eNB or eNodeB) in long term evolution (LTE), a relay node or an access point, a base station in a future 5G network, or the like. This is not limited herein.

The terminal device may be a wireless terminal or a wired terminal. The wireless terminal may be a device that provides a user with voice and/or other service data connectivity, a handheld device having a wireless connection function, or another processing device connected to a wireless modem. The wireless terminal may communicate with one or more core networks by using a radio access network (RAN). The wireless terminal may be a mobile terminal, such as a mobile phone (or referred to as a "cellular" phone) and a computer with a mobile terminal, for example, may be a portable, pocket-sized, handheld, computer built-in, or vehicle-mounted mobile apparatus, which exchanges language and/or data with the radio access network. For example, the wireless terminal may be a device such as a personal communications service (PCS) phone, a cordless phone, a session initiation protocol (SIP) phone, a wireless local loop (WLL) station, or a personal digital assistant (PDA). The wireless terminal may also be referred to as a system, a subscriber unit, a subscriber station, a mobile station, a mobile console, a remote station, a remote terminal, an access terminal, a user terminal, a user agent, or user equipment. This is not limited herein.

The following describes the technical solutions of this application in detail by using the communications system as an example and some embodiments. The following several embodiments may be combined with each other, and a same or similar concept or process may not be repeatedly described in some embodiments.

Figure 3:
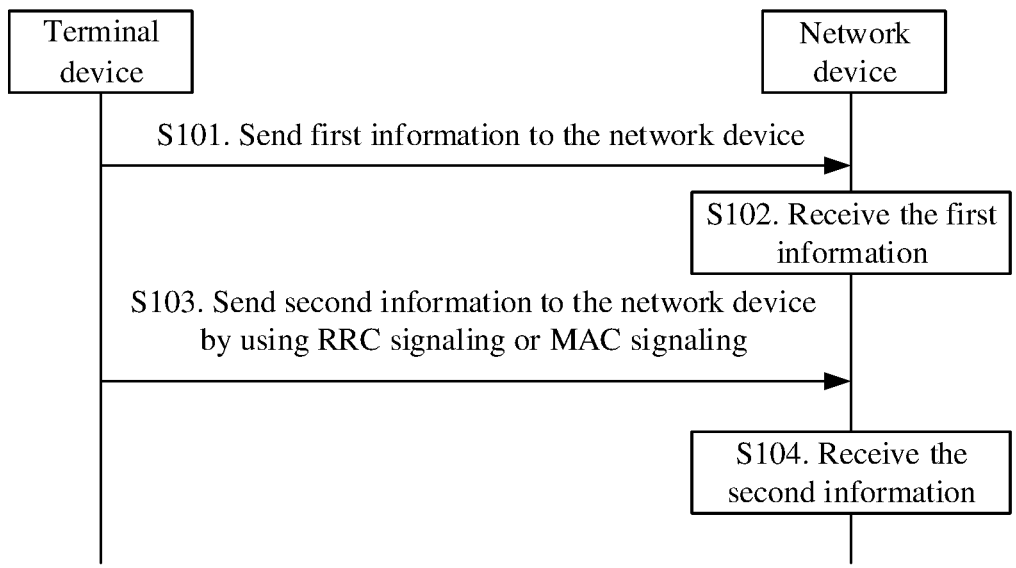
FIG. 3 is a signaling flowchart of a data transmission method in this application.

FIG. 3 is a signaling flowchart of a data transmission method in this application. This embodiment is related to a process in which a terminal device reports, to a network device, first information used to indicate a first CQI and second information used to indicate a difference between the first CQI and a second CQI. As shown in FIG. 3, the method may include the following steps.

S101. The terminal device sends first information to the network device.

The first information is used to indicate a first CQI corresponding to a first BLER.

Specifically, the first BLER may follow a BLER in an existing communications system, for example, a 10% BLER. Therefore, after obtaining the first CQI that can reflect quality of a current channel, the terminal device may send the first information to the network device. Optionally, the terminal device may send the first information to the network device in an existing CQI sending manner. Alternatively, the terminal device may send the first information to the network device by using any one of physical layer signaling, radio resource control (RRC) signaling, media access control (MAC) signaling, and the like. When the terminal device sends the first information to the network device by using higher layer signaling such as RRC signaling, uplink physical layer control signaling overheads can be reduced.

A manner in which the terminal device obtains the first CQI is not limited in this embodiment. For example, the terminal device may obtain a signal-to-noise ratio (SNR) of a current channel between the terminal device and the network device through calculation based on a pilot signal sent by the network device, and then determine, based on the SNR and the first BLER, the first CQI that can reflect the quality of the current channel. Optionally, the terminal device may further determine the first CQI in an existing CQI determining manner. Details are not described herein.

S102. The network device receives the first information.

Specifically, after the network device receives the first information sent by the terminal device, the network device may obtain, by using the first information, the first CQI corresponding to the first BLER.

S103. The terminal device sends second information to the network device by using RRC signaling or MAC signaling.

The second information is used to indicate a difference between the first CQI and a second CQI, the second CQI is a CQI corresponding to a second BLER, and the first BLER is greater than the second BLER.

Specifically, the terminal device may further send the second information to the network device by using the RRC signaling or the MAC signaling. In this manner, uplink physical layer control signaling overheads can be reduced. Certainly, alternatively, the terminal device may send the second information to the network device in an existing CQI sending manner, the terminal device may send the second information to the network device by using physical layer signaling, or the like. This is not limited in this embodiment.

The second CQI is the CQI corresponding to the second BLER, and a value of the second BLER may be specifically determined based on a reliability indicator of a currently transmitted service of the terminal device. For example, the currently transmitted service of the terminal device is a URLLC service. If the reliability indicator of the URLLC service of the terminal device is 99.99%, the second BLER may be a 0.01% BLER. If the reliability indicator of the URLLC service of the terminal device is 99.999%, the second BLER may be a 0.001% BLER, or the like.

Optionally, the second information may explicitly indicate the difference between the first CQI and the second CQI. For example, the second information may indicate the difference between the first CQI and the second CQI by carrying the difference between the first CQI and the second CQI. Optionally, the second information may implicitly indicate the difference between the first CQI and the second CQI. For example, the second information implicitly indicates the difference between the first CQI and the second CQI by carrying a transmission parameter "used to determine the difference between the first CQI and the second CQI", or the like.

Optionally, the terminal device may send the first information and the second information in a same sending period, or may send the first information and the second information in different sending periods.

When the terminal device sends the first information and the second information in the same sending period, in other words, when a sending period for sending the first information by the terminal device is the same as a sending period for sending the second information by the terminal device, the terminal device may simultaneously perform steps S101 and S103. For example, the sending period described herein may be an existing CQI reporting period.

When the terminal device sends the first information and the second information in the different periods, in other words, when a sending period for sending the first information by the terminal device is different from a sending period for sending the second information by the terminal device, the terminal device may perform steps S101 and S103 in the different sending periods. For example, the terminal device may periodically send the first CQI to the network device in a first period, and periodically send the second information to the network device in a second period greater than the first period. For example, the first period may be an existing CQI reporting period. In this manner, uplink resource overheads can be reduced while it is ensured that the terminal device sends the first information and the second information to the network device.

S104. The network device receives the second information.

Specifically, after receiving the second information sent by the terminal device by using the RRC signaling or the MAC signaling, the network device may indirectly obtain, based on the first CQI obtained in step S102 and the second information used to indicate the difference between the first CQI and the second CQI, the second CQI corresponding to the second BLER. In this manner, the network device can obtain two CQIs corresponding to different BLERs, and the network device can determine, based on reliability and latency requirements of a currently transmitted service of the terminal device, CQIs respectively used during initial data transmission and data retransmission.

The first CQI is greater than the second CQI because the first BLER corresponding to the first CQI is greater than the second BLER corresponding to the second CQI. Therefore, a first MCS determined by the network device based on the first CQI is higher than a second MCS determined by the network device based on the second CQI. To be specific, after the network device encodes same data by using the first MCS and the second MCS, a data amount obtained by using the first MCS is less than a data amount obtained by using the second MCS. Therefore, the network device determines, based on reliability and latency requirements of a currently transmitted service of the terminal device, CQIs respectively used during initial data transmission and data retransmission, to transmit service data by using as few spectrum resources as possible while ensuring the reliability and latency requirements of the currently transmitted service of the terminal device, thereby improving spectrum resource utilization.

According to the data transmission method provided in this application, the terminal device sends, to the network device, the first information used to indicate the first CQI and the second information used to indicate the difference between the first CQI and the second CQI, so that the network device can obtain the first CQI and the second CQI that have different BLERs, and the network device can determine, based on reliability and latency requirements of a currently transmitted service of the terminal device, CQIs respectively used during initial data transmission and data retransmission, to transmit service data by using as few spectrum resources as possible while ensuring the reliability and latency requirements of the currently transmitted service of the terminal device, thereby improving spectrum resource utilization.

Figure 4:
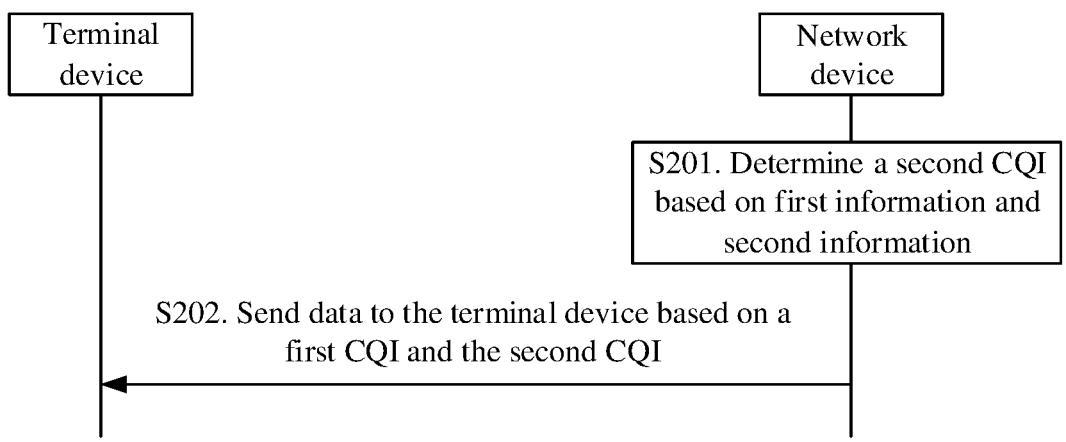
FIG. 4 is a signaling flowchart of another data transmission method in this application.

FIG. 4 is a signaling flowchart of another data transmission method in this application. This embodiment is related to a process in which the network device sends data to the terminal device based on the first CQI and the second CQI. In this case, after S104, the method may further include the following steps.

S201. The network device determines a second CQI based on first information and second information.

Specifically, after the network device receives the second information used to indicate a difference between a first CQI and the second CQI, the network device may first obtain the difference between the first CQI and the second CQI based on the second information, and then the network device may subtract "the difference between the first CQI and the second CQI" from the first CQI determined based on the first information to obtain the second CQI.

S202. The network device sends data to the terminal device based on a first CQI and the second CQI.

Specifically, after obtaining the first CQI and the second CQI, the network device may determine a first MCS based on the first CQI, and determine a second MCS based on the second CQI. Further, the network device may determine, based on a latency requirement of a currently transmitted service of the terminal device, MCSs respectively used during initial data transmission and data retransmission, and send data to the terminal device based on the determined MCSs. The first CQI is greater than the second CQI because a first BLER corresponding to the first CQI is greater than a second BLER corresponding to the second CQI. Therefore, the first MCS determined by the network device based on the first CQI is higher than the second MCS determined by the network device based on the second CQI. To be specific, after the network device encodes same data by using the first MCS and the second MCS, a data amount obtained by using the first MCS is less than a data amount obtained by using the second MCS. Therefore, the network device determines, based on reliability and latency requirements of the currently transmitted service of the terminal device, CQIs respectively used during initial data transmission and data retransmission, to send data based on MCSs corresponding to the CQIs. In this manner, the network device can transmit service data by using as few spectrum resources as possible while ensuring the reliability and latency requirements of the currently transmitted service of the terminal device, thereby improving spectrum resource utilization.

Optionally, if an allowed largest latency of the currently transmitted service of the terminal device is large enough, after initially transmitting data to the terminal device by using the first MCS corresponding to the first CQI, the network device can retransmit, when a difference between the largest latency allowed by the terminal device and a current latency is greater than a first preset threshold, the data to the terminal device by using the first MCS, or retransmit, when a difference between the largest latency allowed by the terminal device and a current latency is less than or equal to a preset threshold, the data to the terminal device by using the second MCS corresponding to the second CQI. The first preset threshold may be specifically determined based on the allowed largest latency of the currently transmitted service. In this manner, spectrum resource utilization can be further improved.

For example, the currently transmitted service of the terminal device is a URLLC service, and an allowed largest latency of the URLLC service is 1 ms. If the first preset threshold is 0.5 ms, after the network device initially transmits the data to the terminal device by using the first MCS corresponding to the first CQI, each time the network device retransmits the data to the terminal device, if the difference (namely, a current remaining latency) between the largest latency allowed by the terminal device and the current latency is greater than 0.5 ms, the network device encodes and transmits, by using the first MCS corresponding to the first CQI, a data packet that previously fails to be sent. If a current remaining latency is less than or equal to 0.5 ms, the network device encodes and transmits, by using the second MCS corresponding to the second CQI, a data packet that previously fails to be sent.

Optionally, when a largest latency allowed by the terminal device is less than or equal to a second preset threshold, in other words, the allowed largest latency of the currently transmitted service of the terminal device is very short, for example, when only one transmission is allowed, the network device can initially transmit and retransmit data to the terminal device, only by using the second MCS corresponding to the second CQI, to meet reliability and latency requirements of the currently transmitted service. The second preset threshold may be specifically determined based on the allowed largest latency of the currently transmitted service.

According to the data transmission method provided in this application, after obtaining the first CQI and the second CQI that have different BLERs, the network device can determine, based on the reliability and latency requirements of the currently transmitted service of the terminal device, CQIs respectively used during initial data transmission and data retransmission, to transmit service data by using as few spectrum resources as possible while ensuring the reliability and latency requirements of the currently transmitted service of the terminal device, thereby improving spectrum resource utilization.

Figure 5:
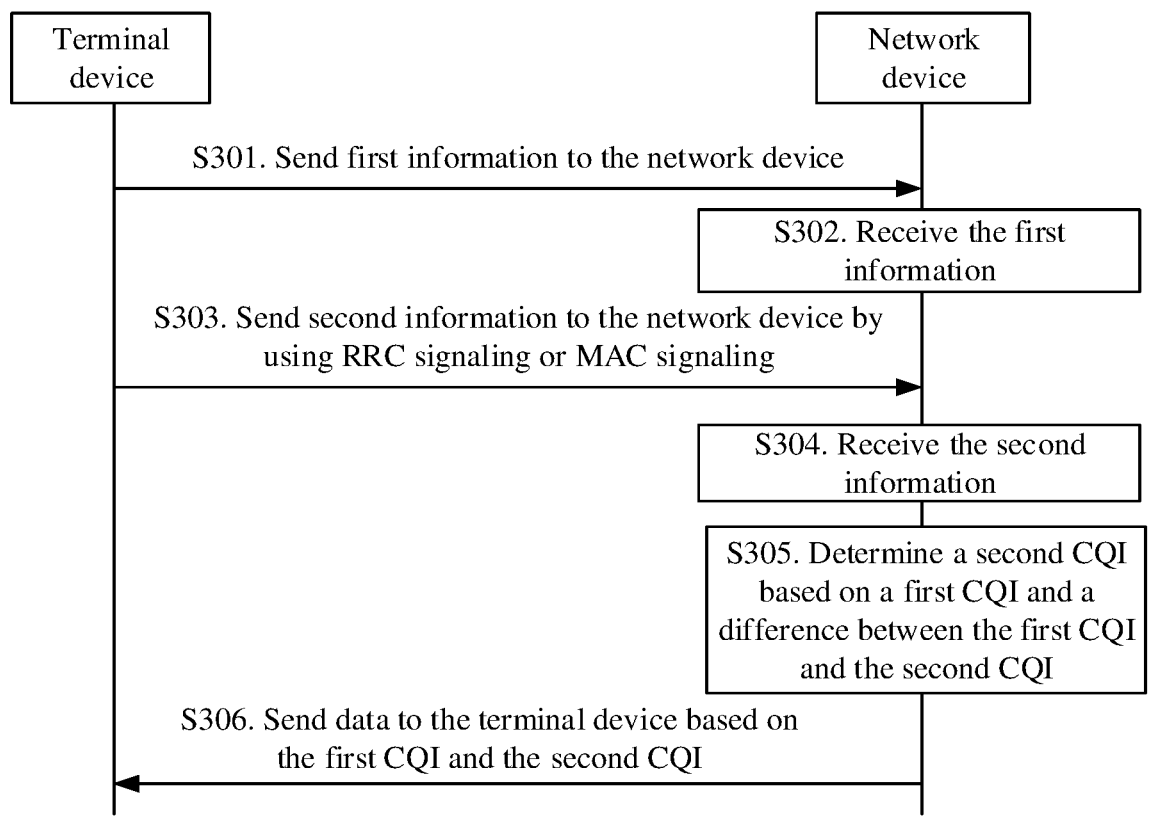
FIG. 5 is a signaling flowchart of still another data transmission method in this application.

FIG. 5 is a signaling flowchart of still another data transmission method in this application. In this embodiment, second information includes a difference, briefly referred to as ΔCQI in this application, between a first CQI and a second CQI. In other words, the second information explicitly indicates the difference between the first CQI and the second CQI by carrying ΔCQI. As shown in FIG. 5, the method may include the following steps.

S301. A terminal device sends first information to a network device.

The first information is used to indicate a first CQI corresponding to a first BLER.

S302. The network device receives the first information.

For descriptions of steps S301 and S302, refer to S101 and S102. Details are not described herein again.

S303. The terminal device sends second information to the network device by using RRC signaling or MAC signaling.

The second information includes ΔCQI.

Specifically, in a same channel quality condition, correspondences between different BLERs and CQIs are related to transmission parameters of the terminal device. For example, it is assumed that the transmission parameters of the terminal device are as follows: A reliability indicator is 99.99%, a transmission mode is an open-loop multiple-input multiple-output (MIMO) technology, a receiver uses a minimum mean square error (MMSE) algorithm, a receive antenna has two ports, a Doppler frequency shift is small, and no extra demodulation reference signal is configured. For example, the first BLER is a 10% BLER, and a second BLER is a 0.01% BLER. In the transmission parameters, for example, CQIs corresponding to different BLERs of the terminal device may be shown in Table 1:

TABLE 1

Correspondence between a BLER and a CQI

| | BLER | | |
|---|---|---|---|
| SNR | First CQI (a 10% BLER) | Second CQI (a 0.01% BLER) | ΔCQI |
| 0 | 5 | 3 | 2 |
| 5 | 8 | 5 | 3 |
| 10 | 12 | 7 | 5 |

The SNR in Table 1 is used to represent channel quality. It can be learned from Table 1 that when the transmission parameter of the terminal device is determined, the correspondence between the BLER and the CQI is determined in the same channel quality condition. Therefore, the difference ΔCQI between the first CQI and the second CQI is also determined in the same channel quality condition. For example, when the SNR is 0, the first CQI corresponding to the first BLER is 5, and the second CQI corresponding to the second BLER is 3. Therefore, ΔCQI is 2 when the SNR is 0.

Therefore, in this embodiment, the terminal device may store the correspondence that is between the BLER and the CQI and that is shown in Table 1. In this way, the terminal device may first obtain an SNR of a current channel between the terminal device and the network device through calculation based on a pilot signal sent by the network device, and then determine the first CQI based on the SNR and the first BLER. Then, the terminal device may determine, based on the first CQI, the SNR of the current channel between the terminal device and the network device, the second BLER, and the stored correspondence between the BLER and the CQI, ΔCQI corresponding to the first CQI. In this way, the terminal device may add ΔCQI to the second information, and send the second information to the network device by using the RRC signaling or the MAC signaling, to reduce uplink physical layer control signaling overheads. Certainly, alternatively, the terminal device may send the second information to the network device in an existing CQI sending manner, the terminal device may send the second information to the network device by using physical layer signaling, or the like. This is not limited in this embodiment.

Optionally, the terminal device may send the first information and the second information in a same sending period, or may send the first information and the second information in different sending periods.

When the terminal device sends the first information and the second information in the same sending period, in other words, when a sending period for sending the first information by the terminal device is the same as a sending period for sending the second information by the terminal device, the terminal device may simultaneously perform steps S301 and S303. For example, the sending period described herein may be an existing CQI reporting period.

When the terminal device sends the first information and the second information in the different periods, in other words, when a sending period for sending the first information by the terminal device is different from a sending period for sending the second information by the terminal device, the terminal device may perform steps S301 and S303 in the different sending periods. For example, the terminal device may periodically send the first CQI to the network device in a first period, and periodically send the second information to the network device in a second period greater than the first period. For example, the first period may be an existing CQI reporting period. In this manner, uplink resource overheads can be reduced while it is ensured that the terminal device sends the first information and the second information to the network device.

S304. The network device receives the second information.

S305. The network device determines a second CQI based on a first CQI and a difference between the first CQI and the second CQI.

Specifically, after receiving the first CQI and the second information carrying ΔCQI, the network device may subtract ΔCQI from the first CQI to obtain the second CQI.

S306. The network device sends data to the terminal device based on the first CQI and the second CQI.

For description of step S306, refer to S202. Details are not described herein again.

According to the data transmission method provided in this application, the terminal device sends, to the network device, the first information used to indicate the first CQI and the second information carrying the difference between the first CQI and the second CQI, so that the network device can obtain the first CQI and the second CQI that have different BLERs, and the network device can determine, based on reliability and latency requirements of a currently transmitted service of the terminal device, CQIs respectively used during initial data transmission and data retransmission, to transmit service data by using as few spectrum resources as possible while ensuring the reliability and latency requirements of the currently transmitted service of the terminal device, thereby improving spectrum resource utilization.

Figure 6:
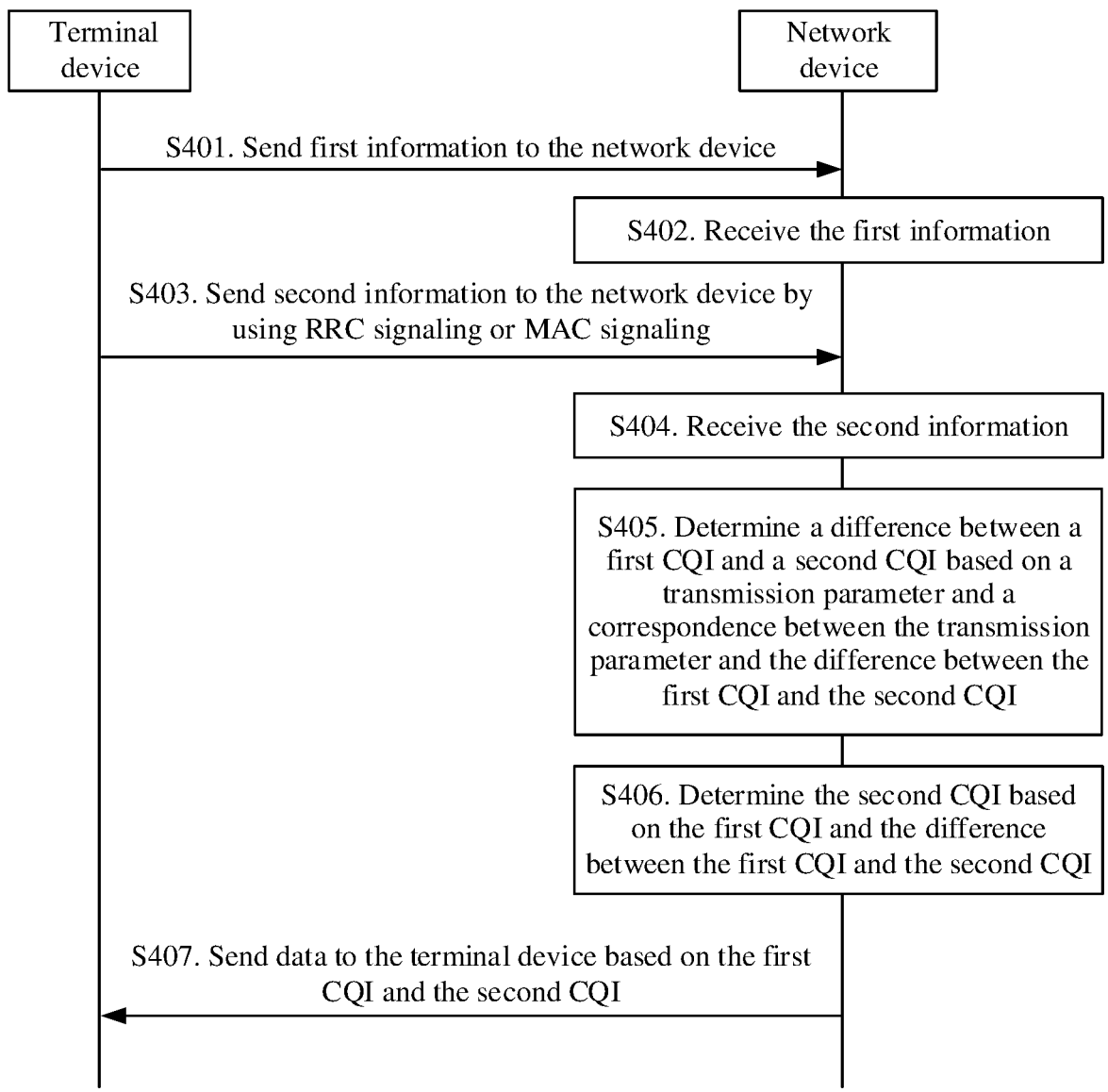
FIG. 6 is a signaling flowchart of still another data transmission method in this application.

FIG. 6 is a signaling flowchart of still another data transmission method in this application. In this embodiment, second information includes a transmission parameter currently used by a terminal device. In other words, the second information implicitly indicates a difference between a first CQI and a second CQI by using the transmission parameter currently used by the terminal device. As shown in FIG. 6, the method may include the following steps.

S401. The terminal device sends first information to a network device.

The first information is used to indicate a first CQI corresponding to a first BLER.

S402. The network device receives the first information.

For descriptions of steps S401 and S402, refer to S101 and S102. Details are not described herein again.

S403. The terminal device sends second information to the network device by using RRC signaling or MAC signaling.

The second information includes a transmission parameter currently used by the terminal device.

Specifically, in this embodiment, both the terminal device and the network device store "a correspondence between the transmission parameter of the terminal device and ΔCQI". In other words, the transmission parameter of the terminal device is in the one-to-one correspondence with ΔCQI. Therefore, the terminal device may add, to the second information, the transmission parameter currently used by the terminal device, and send the second information to the network device, so that the network device can indirectly obtain ΔCQI based on the transmission parameter currently used by the terminal device. In addition, the terminal device sends the second information to the network device by using the RRC signaling or the MAC signaling, to reduce uplink physical layer control signaling overheads. Certainly, alternatively, the terminal device may send the second information to the network device in an existing CQI sending manner, the terminal device may send the second information to the network device by using physical layer signaling, or the like. This is not limited in this embodiment.

The transmission parameter included in the second information may include one or more of the following: a reliability indicator of a currently transmitted service, a transmission mode, a receiving algorithm, a quantity of receive antenna ports of the terminal device, a Doppler frequency shift, an SNR, multipath latency distribution of a radio channel, and the like. In other words, the transmission parameter included in the second information may be a transmission parameter that affects a value of ΔCQI. For example, the transmission mode may be open-loop MIMO, closed-loop MIMO, multi-user multiple-input multiple-output (MU-MIMO), or beamforming. For example, the receiving algorithm may be a minimum mean square error (MMSE) algorithm, a maximum likelihood (ML) detection algorithm, a zero forcing (Zero Forcing, ZF) detection algorithm, a minimum mean square error serial interference cancellation (MMSE-SIC) algorithm, or a zero forcing serial interference cancellation (ZF-SIC) algorithm.

A reliability indicator of a URLLC service is used as an example. In a same channel quality condition, when the reliability indicator of the URLLC service is 99.99%, a second CQI is a CQI corresponding to a 0.01% BLER (namely, a second BLER). When the reliability indicator of the URLLC service is 99.999%, a second CQI is a CQI corresponding to a 0.001% BLER (namely, a second BLER). Because second BLERs are different when reliability indicators of the URLLC service are different, values of second CQIs corresponding to the second BLERs are different, and values of differences ΔCQI between first CQIs and the second CQIs are also different. Therefore, differences ΔCQI corresponding to the different reliability indicators are different in the same channel quality condition.

The receiving algorithm is used as an example. When the network device sends, to the terminal device in a same channel quality condition, data encoded by using an MCS corresponding to a same CQI, if the terminal device receives the data by using different receiving algorithms, BLERs of the data received by the terminal device are different. The network device needs to use different MCSs for the terminal device based on the receiving algorithms used by the terminal device, so that the BLERs of the data received by the terminal device are the same when the terminal device uses the different receiving algorithms. To be specific, for a same BLER, MCSs corresponding to the different receiving algorithms are different, and CQIs corresponding to the different MCSs are different. Therefore, for the same BLER, CQIs corresponding to the different receiving algorithms are different, and therefore values of differences ΔCQI between first CQIs and second CQIs are also different.

The Doppler frequency shift is used as an example. A higher moving speed of the terminal device indicates a larger Doppler frequency shift of the terminal device, so that a BLER of data received by the terminal device is higher. To ensure a same BLER of the data received by the terminal device, required CQIs are different when Doppler frequency shifts of the terminal device are different. Therefore, for a same BLER, CQIs corresponding to the different Doppler frequency shifts are different, and therefore values of differences ΔCQI between first CQIs and second CQIs are also different.

In this embodiment, transmission parameters specifically included in the second information are related to "the correspondence that is between the transmission parameter and ΔCQI" and that is stored in the terminal device and the network device.

FIG. 7 shows a correspondence between a transmission parameter and ΔCQI in this application. When FIG. 7 shows "the correspondence that is between the transmission parameter and ΔCQI" and that is stored in the terminal device and the network device, because each transmission parameter shown in FIG. 7 is variable, the terminal device may add, to the second information, the following transmission parameters: a transmission mode currently used by the terminal device, a quantity of receive antenna ports, a Doppler frequency shift, and an SNR, so that the network device can accurately determine currently used ΔCQI based on the relationship.

Figures 8, 9:
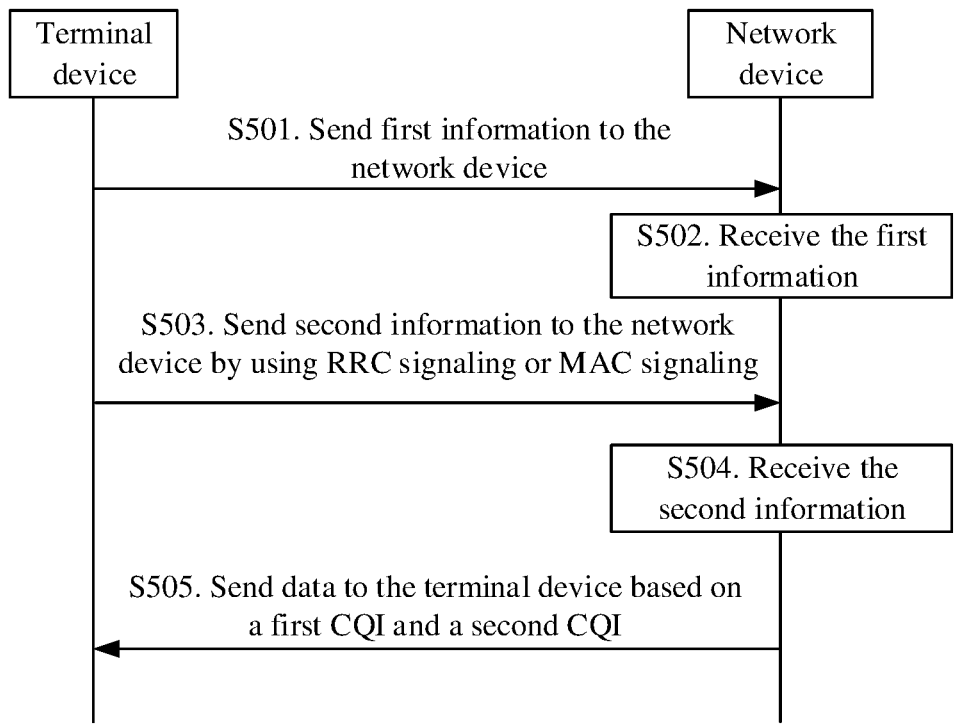
FIG. 8 shows another correspondence between a transmission parameter and $\Delta$CQI in this application.
FIG. 9 is a signaling flowchart of still another data transmission method in this application.

FIG. 8 shows another correspondence between a transmission parameter and ΔCQI in this application. When FIG. 8 shows "the correspondence that is between the transmission parameter and ΔCQI" and that is stored in the terminal device and the network device, because a transmission mode, a quantity of receive antenna ports, and a receiving algorithm that are shown in FIG. 8 are invariable, and only a Doppler frequency shift and an SNR are variable, the terminal device may add, to the second information, only the following transmission parameters: a Doppler frequency shift and an SNR that are currently used by the terminal device. In this manner, the network device can accurately determine currently used ΔCQI based on the relationship. In addition, uplink signaling overheads are reduced because the second information carries a relatively small quantity of transmission parameters.

It should be noted that "the correspondences between the transmission parameters and ΔCQI" shown in FIG. 7 and FIG. 8 are merely examples. "The correspondence that is between the transmission parameter and ΔCQI" and that is stored in the terminal device and the network device is not limited thereto. Any correspondence between a transmission parameter that affects ΔCQI and ΔCQI may be stored in the terminal device and the network device.

In the foregoing examples, the second information explicitly indicates, by carrying the transmission parameter currently used by the terminal device, the transmission parameter currently used by the terminal device. Optionally, alternatively, the terminal device may determine, based on a transmission parameter that currently needs to be reported to the network device, second information used to implicitly indicate the transmission parameter. For example, if the terminal device needs to report an SNR to the network device, the terminal device may use a first CQI as the second information and send the second information to the network device, so that the network device obtains an SNR of a current channel between the terminal device and the network device through calculation by using the first CQI. If the terminal device currently needs to report a Doppler frequency shift to the network device, the terminal device may use uplink data as the second information and send the second information to the network device, so that the network device obtains, by detecting whether an extra demodulation reference signal is configured in the uplink data, a Doppler frequency shift included in the second information, or the like.

Optionally, the terminal device may send the first information and the second information in a same sending period, or may send the first information and the second information in different sending periods.

When the terminal device sends the first information and the second information in the same sending period, in other words, when a sending period for sending the first information by the terminal device is the same as a sending period for sending the second information by the terminal device, the terminal device may simultaneously perform steps S401 and S403. For example, the sending period described herein may be an existing CQI reporting period.

When the terminal device sends the first information and the second information in the different periods, in other words, when a sending period for sending the first information by the terminal device is different from a sending period for sending the second information by the terminal device, the terminal device may perform steps S401 and S403 in the different sending periods. For example, the terminal device may periodically send the first CQI to the network device in a first period, and periodically send the second information to the network device in a second period greater than the first period. For example, the first period may be an existing CQI reporting period. In this manner, uplink resource overheads can be reduced while it is ensured that the terminal device sends the first information and the second information to the network device.

Alternatively, the terminal device may periodically send the first information to the network device, and send the second information to the network device only when the transmission parameter of the terminal device changes. In this manner, uplink resource overheads can be reduced while it is ensured that the network device can obtain the first information and the second information. If a change of the transmission parameter of the terminal device is controlled by the network device, in other words, when the network device can learn, without a need for reporting by the terminal device, that the transmission parameter such as a receiving algorithm or a transmission mode of the terminal device changes, step S403 is not necessary in this embodiment, in other words, S403 may not be performed.

S404. The network device receives the second information.

Optionally, if a change of the transmission parameter of the terminal device is controlled by the network device, in other words, when the network device can learn, without a need for reporting by the terminal device, that the transmission parameter such as a receiving algorithm or a transmission mode of the terminal device changes, the terminal device may not perform S403. Correspondingly, in this scenario, step S404 is not necessary in this embodiment, in other words, S404 may not be performed.

S405. The network device determines a difference between a first CQI and a second CQI based on a transmission parameter and a correspondence between the transmission parameter and the difference between the first CQI and the second CQI.

Specifically, if the second information carries the transmission parameter currently used by the terminal device, after receiving the second information, the network device may search, based on the transmission parameter that is currently used by the terminal device and that is included in the second information, the correspondence that is between the transmission parameter and ΔCQI and that is stored in the network device for a transmission parameter that is the same as the transmission parameter currently used by the terminal device, and use ΔCQI corresponding to the transmission parameter as the difference between the first CQI and the second CQI.

If the second information implicitly indicates the transmission parameter currently used by the terminal device, after receiving the second information, the network device may first determine, based on the second information, the transmission parameter currently used by the terminal device. Then, the network device searches, based on the transmission parameter currently used by the terminal device, the correspondence that is between the transmission parameter and ΔCQI and that is stored in the network device for a transmission parameter that is the same as the transmission parameter currently used by the terminal device, and uses ΔCQI corresponding to the transmission parameter as the difference between the first CQI and the second CQI.

For example, still referring to FIG. 7, if the network device determines, by using the second information, that transmission parameters currently used by the terminal device are a transmission mode 1, a quantity 2 of receive antenna ports, a Doppler frequency shift 1, and an SNR 2, ΔCQI determined based on the second information and the correspondence that is between the transmission parameter and ΔCQI and that is stored in the network device is ΔCQI 6, in other words, ΔCQI 6 is the difference between the first CQI and the second CQI.

For example, still referring to FIG. 8, if the network device determines, by using the second information, that transmission parameters currently used by the terminal device are a Doppler frequency shift 1 and an SNR 2, ΔCQI determined based on the second information and the correspondence that is between the transmission parameter and ΔCQI and that is stored in the network device is ΔCQI 2, in other words, ΔCQI 2 is the difference between the first CQI and the second CQI.

S406. The network device determines the second CQI based on the first CQI and the difference between the first CQI and the second CQI.

Specifically, after receiving the first CQI and the second information carrying ΔCQI, the network device may subtract ΔCQI from the first CQI to obtain the second CQI.

S407. The network device sends data to the terminal device based on the first CQI and the second CQI.

For description of step S407, refer to S202. Details are not described herein again.

Optionally, before S403, the method may further include: sending, by the terminal device, third information to the network device, where the third information is used to indicate the correspondence between "the transmission parameter and the difference between the first CQI and the second CQI".

Specifically, before the terminal device sends, to the network device, the second information used to carry the transmission parameter currently used by the terminal device, the terminal device may send, to the network device, the third information used to indicate "the correspondence between the transmission parameter and ΔCQI". Correspondingly, before S404, the network device may further receive the third information. In this way, after subsequently receiving the second information, the network device may determine the difference between the first CQI and the second CQI based on the second information and the correspondence indicated by the third information. In specific implementation, the terminal device may send the third information to the network device by using RRC signaling, physical layer control information, or the like, to reduce uplink physical layer control signaling overheads. Certainly, alternatively, the terminal device may send the third information to the network device in another manner. This is not limited herein.

Optionally, the terminal device may send the third information to the network device when initially accessing the network device. In this scenario, the third information may be used to indicate "correspondences between all transmission parameters and ΔCQI", or may be used to indicate "the correspondence that is between the transmission parameter and ΔCQI" and that is shown in FIG. 7 or FIG. 8. Optionally, alternatively, the terminal device may send the third information to the network device when the transmission parameter of the terminal device changes. In this scenario, the third information may be used to indicate "a correspondence between the changed transmission parameter and ΔCQI", or may be used to indicate "correspondences between all transmission parameters and ΔCQI".

According to the data transmission method provided in this application, the terminal device sends, to the network device, the first information used to indicate the first CQI and the second information used to indicate the difference between the first CQI and the second CQI, so that the network device can obtain the first CQI and the second CQI that have different BLERs, and the network device can determine, based on reliability and latency requirements of a currently transmitted service of the terminal device, CQIs respectively used during initial data transmission and data retransmission, to transmit service data by using as few spectrum resources as possible while ensuring the reliability and latency requirements of the currently transmitted service of the terminal device, thereby improving spectrum resource utilization.

FIG. 9 is a signaling flowchart of still another data transmission method in this application. In this embodiment, second information includes a second CQI. In other words, the second information explicitly indicates the second CQI by using the second CQI. As shown in FIG. 9, the method may include the following steps.

S501. A terminal device sends first information to a network device.

The first information is used to indicate a first CQI corresponding to a first BLER.

S502. The network device receives the first information.

For descriptions of steps S501 and S502, refer to S101 and S102. Details are not described herein again.

S503. The terminal device sends second information to the network device by using RRC signaling or MAC signaling.

The second information includes a second CQI.

Specifically, in this embodiment, the terminal device may obtain a signal-to-noise ratio (SNR) of a current channel between the terminal device and the network device through calculation based on a pilot signal sent by the network device, then determine the first CQI and the second CQI based on the SNR, the first BLER, and a second BLER, and add the second CQI to the second information. Then, the terminal device sends the second information to the network device by using the RRC signaling or the MAC signaling, to reduce uplink physical layer control signaling overheads while ensuring that the network device receives the second information. Certainly, alternatively, the terminal device may send the second information to the network device in an existing CQI sending manner, the terminal device may send the second information to the network device by using physical layer signaling, or the like. This is not limited in this embodiment.

Optionally, the terminal device may send the first information and the second information in a same sending period, or may send the first information and the second information in different sending periods.

When the terminal device sends the first information and the second information in the same sending period, in other words, when a sending period for sending the first information by the terminal device is the same as a sending period for sending the second information by the terminal device, the terminal device may simultaneously perform steps S501 and S503. For example, the sending period described herein may be an existing CQI reporting period.

When the terminal device sends the first information and the second information in the different periods, in other words, when a sending period for sending the first information by the terminal device is different from a sending period for sending the second information by the terminal device, the terminal device may perform steps S501 and S503 in the different sending periods. For example, the terminal device may periodically send the first CQI to the network device in a first period, and periodically send the second information to the network device in a second period greater than the first period. For example, the first period may be an existing CQI reporting period. In this manner, uplink resource overheads can be reduced while it is ensured that the terminal device sends the first information and the second information to the network device.

S504. The network device receives the second information.

S505. The network device sends data to the terminal device based on a first CQI and a second CQI.

For description of step S505, refer to S202. Details are not described herein again.

According to the data transmission method provided in this application, the terminal device sends, to the network device, the first information used to indicate the first CQI and the second information used to indicate the second CQI, so that the network device can obtain the first CQI and the second CQI that have different BLERs, and the network device can determine, based on reliability and latency requirements of a currently transmitted service of the terminal device, CQIs respectively used during initial data transmission and data retransmission, to transmit service data by using as few spectrum resources as possible while ensuring the reliability and latency requirements of the currently transmitted service of the terminal device, thereby improving spectrum resource utilization.

It should be noted that the data transmission method provided in this application is applicable to both a scenario of transmitting URLLC service data and a scenario of transmitting other service data by the network device based on CQIs that have different BLERs and that are reported by the terminal device. Implementation principles and technical effects of the data transmission method are similar to those in the foregoing embodiment. Details are not described herein again.

In the foregoing embodiment, the network device initially transmits data and retransmits data that previously fails to be transmitted, to ensure reliability of a currently transmitted service of the terminal device. In this embodiment, the network device retransmits previously transmitted data for a plurality of times, to ensure reliability of a currently transmitted service of the terminal device. In other words, in a process in which the network device retransmits the data to the terminal device, the terminal device does not need to feed back an Ack message or a Nack message, but feeds back an Ack message or a Nack message to the network device once after a maximum quantity of retransmissions is reached, to indicate, by using the message, whether the terminal device successfully receives the data. In a manner of retransmitting the data for a plurality of times, a data sending latency can be shortened while the reliability of the currently transmitted service of the terminal device is ensured.

Figure 10:
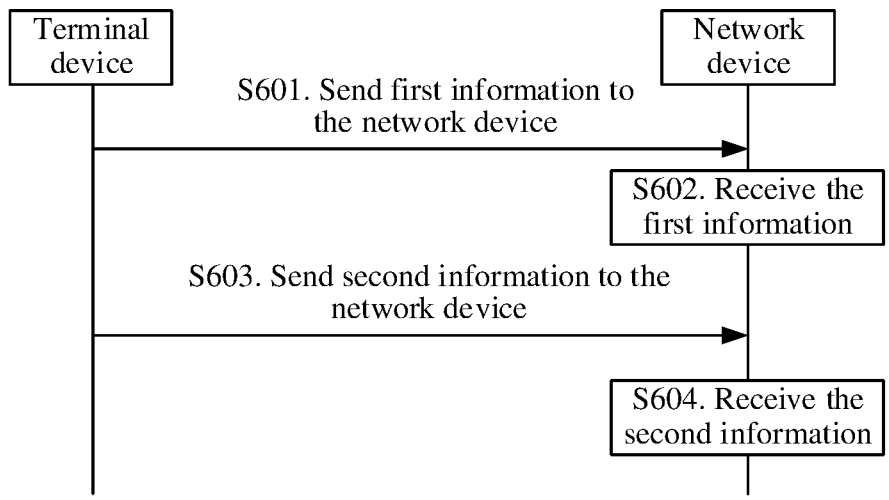
FIG. 10 is a signaling flowchart of still another data transmission method in this application.

Therefore, in this scenario, the network device needs to learn of a maximum quantity of retransmissions of the currently transmitted service of the terminal device, so that the network device can retransmit the data to the terminal device based on the maximum quantity of retransmissions. FIG. 10 is a signaling flowchart of still another data transmission method in this application. This embodiment is related to a process in which a terminal device reports, to a network device, first information used to indicate a first maximum quantity of retransmissions that is corresponding to a first BLER and second information used to indicate a difference between the first maximum quantity of retransmissions and a second maximum quantity of retransmissions. As shown in FIG. 10, the method may include the following steps.

S601. The terminal device sends first information to the network device.

The first information is used to indicate a first maximum quantity of retransmissions that is corresponding to a first BLER.

Specifically, when transmission parameters of the terminal device are determined, correspondences between different BLERs and maximum quantities of retransmissions are also determined. For example, if the transmission parameters of the terminal device are as follows: A reliability indicator of a currently transmitted service (for example, a URLLC service) is 99.9999%, a transmission mode is open-loop MIMO, a receiver uses an MMSE-SIC algorithm, and a receive antenna has two ports, the correspondences between the different BLERs and the maximum quantities of retransmissions are also determined in the transmission parameters. For example, a maximum quantity of retransmissions that is corresponding to a 10% BLER is 16.

Therefore, in this embodiment, the terminal device stores "correspondences between BLERs and maximum quantities of retransmissions" in different transmission parameters. In this way, the terminal device may obtain, based on the determined transmission parameters by using the stored correspondences, the first maximum quantity of retransmissions that is corresponding to the first BLER, and may send, to the network device, the first information used to indicate the first maximum quantity of retransmissions.

Optionally, the terminal device may send the first information to the network device in an existing CQI sending manner. Alternatively, the terminal device may send the first information to the network device by using any one of physical layer signaling, radio resource control (RRC) signaling, media access control (MAC) signaling, and the like. When the terminal device sends the first information to the network device by using higher layer signaling such as RRC signaling, uplink physical layer control signaling overheads can be reduced.

S602. The network device receives the first information.

Specifically, after the network device receives the first information sent by the terminal device, the network device may obtain, by using the first information, the first maximum quantity of retransmissions that is corresponding to the first BLER.

S603. The terminal device sends second information to the network device.

The second information is used to indicate a difference between the first maximum quantity of retransmissions and a second maximum quantity of retransmissions, the second maximum quantity of retransmissions is a maximum quantity of retransmissions that is corresponding to a second block error rate, and the first block error rate is greater than the second block error rate.

As described in the foregoing step, when the transmission parameters of the terminal device are determined, the correspondences between the different BLERs and the maximum quantities of retransmissions are also determined. Therefore, the terminal device may obtain, based on the determined transmission parameters by using the stored correspondences, the first maximum quantity of retransmissions that is corresponding to the first BLER and the second maximum quantity of retransmissions that is corresponding to the second BLER, and the terminal device may obtain the difference between the first maximum quantity of retransmissions and the second maximum quantity of retransmissions based on the first maximum quantity of retransmissions and the second maximum quantity of retransmissions, so that the terminal device can send, to the network device, the second information used to indicate the difference between the first maximum quantity of retransmissions and the second maximum quantity of retransmissions.

A value of the second BLER may be specifically determined based on a reliability indicator of a currently transmitted service of the terminal device. For example, the currently transmitted service of the terminal device is a URLLC service. If the reliability indicator of the URLLC service of the terminal device is 99.99%, the second BLER may be a 0.01% BLER. If the reliability indicator of the URLLC service of the terminal device is 99.999%, the second BLER may be a 0.001% BLER, or the like.

Optionally, the second information may explicitly indicate the difference between the first maximum quantity of retransmissions and the second maximum quantity of retransmissions. For example, the second information may indicate the difference between the first maximum quantity of retransmissions and the second maximum quantity of retransmissions by carrying the difference between the first maximum quantity of retransmissions and the second maximum quantity of retransmissions. Optionally, if the network device stores "differences between first maximum quantities of retransmissions and second maximum quantities of retransmissions" in different transmission parameters, the second information may further implicitly indicate the difference between the first maximum quantity of retransmissions and the second maximum quantity of retransmissions. For example, the second information implicitly indicates the difference between the first maximum quantity of retransmissions and the second maximum quantity of retransmissions by carrying a transmission parameter "used to determine the difference between the first maximum quantity of retransmissions and the second maximum quantity of retransmissions", or the like. In this way, the network device can obtain the difference between the first maximum quantity of retransmissions and the second maximum quantity of retransmissions based on the transmission parameter and a correspondence stored in the network device.

Optionally, the terminal device may send the second information to the network device in an existing CQI sending manner. Alternatively, the terminal device may send the second information to the network device by using any one of physical layer signaling, radio resource control (RRC) signaling, media access control (MAC) signaling, and the like. When the terminal device sends the second information to the network device by using higher layer signaling such as RRC signaling, uplink physical layer control signaling overheads can be reduced.

Optionally, the terminal device may send the first information and the second information in a same sending period, or may send the first information and the second information in different sending periods.

When the terminal device sends the first information and the second information in the same sending period, in other words, when a sending period for sending the first information by the terminal device is the same as a sending period for sending the second information by the terminal device, the terminal device may simultaneously perform steps S601 and S603. For example, the sending period described herein may be an existing CQI reporting period.

When the terminal device sends the first information and the second information in the different periods, in other words, when a sending period for sending the first information by the terminal device is different from a sending period for sending the second information by the terminal device, the terminal device may perform steps S601 and S603 in the different sending periods. For example, the terminal device may periodically send the first CQI to the network device in a first period, and periodically send the second information to the network device in a second period greater than the first period. For example, the first period may be an existing CQI reporting period. In this manner, uplink resource overheads can be reduced while it is ensured that the terminal device sends the first information and the second information to the network device.

S604. The network device receives the second information.

Specifically, after receiving the second information sent by the terminal device, the network device may indirectly obtain, based on the first maximum quantity of retransmissions obtained in step S602 and the second information used to indicate the difference between the first maximum quantity of retransmissions and the second maximum quantity of retransmissions, the second maximum quantity of retransmissions that is corresponding to the second BLER. In this manner, the network device can obtain the second maximum quantity of retransmissions, so that the network device can retransmit data to the terminal device based on the second maximum quantity of retransmissions, to shorten a data sending latency while ensuring reliability of a currently transmitted service of the terminal device.

According to the data transmission method provided in this application, the terminal device sends, to the network device, the first information used to indicate the first maximum quantity of retransmissions and the second information used to indicate the difference between the first maximum quantity of retransmissions and the second maximum quantity of retransmissions, so that the network device can obtain the second maximum quantity of retransmissions, and the network device can retransmit data to the terminal device based on the second maximum quantity of retransmissions, to shorten a data sending latency while ensuring reliability of a currently transmitted service of the terminal device.

Figure 11:
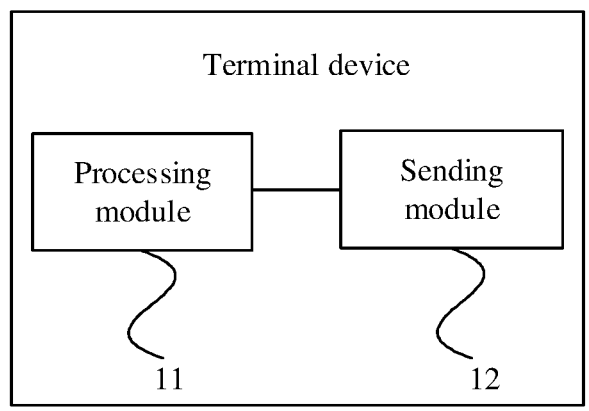
FIG. 11 is a schematic structural diagram of a terminal device in this application.

FIG. 11 is a schematic structural diagram of a terminal device in this application. As shown in FIG. 11, the terminal device may include a processing module 11 and a sending module 12. The sending module 12 is coupled to the processing module 11, and the processing module 11 controls a sending action of the sending module 12.

The sending module 12 is configured to send first information to a network device, where the first information is used to indicate a first channel quality indicator CQI corresponding to a first block error rate.

The sending module 12 is further configured to send second information to the network device by using radio resource control RRC signaling or media access control MAC signaling, where the second information is used to indicate a difference between the first CQI and a second CQI, the second CQI is a CQI corresponding to a second block error rate, and the first block error rate is greater than the second block error rate. Optionally, a sending period of the second information is greater than or equal to a sending period of the first information.

Optionally, the second information may include the difference between the first CQI and the second CQI.

Optionally, in an implementation of this application, the second information includes a transmission parameter currently used by the terminal device, and the transmission parameter is in a one-to-one correspondence with the difference between the first CQI and the second CQI. The transmission parameter may include one or more of the following: a reliability indicator of a currently transmitted service, a transmission mode, a quantity of receive antenna ports, a Doppler frequency shift, a signal-to-noise ratio, and the like.

In this case, in this implementation, the sending module 12 is further configured to: before sending the second information to the network device by using the radio resource control RRC signaling or the media access control MAC signaling, send third information to the network device, where the third information is used to indicate the correspondence between the transmission parameter and the difference between the first CQI and the second CQI.

In this case, in this implementation, the processing module 11 is specifically configured to: when the transmission parameter of the terminal device changes, instruct the sending module 12 to send the second information to the network device by using the RRC signaling or the MAC signaling.

The terminal device provided in this application may perform actions on a terminal device side in the foregoing method embodiments shown in FIG. 3, FIG. 5, and FIG. 6. Implementation principles and technical effects of the terminal device are similar to those in the foregoing method embodiments. Details are not described herein again.

Figure 12:
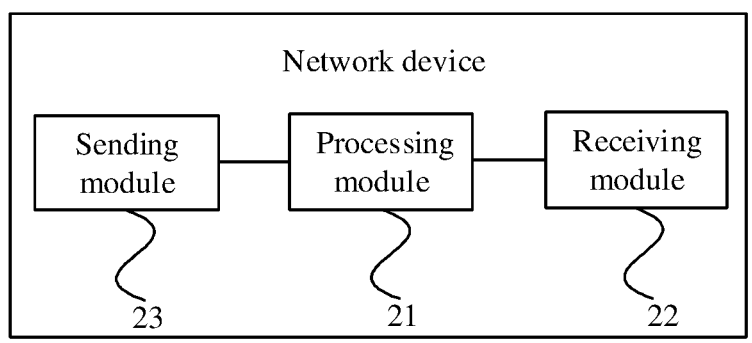
FIG. 12 is a schematic structural diagram of a network device in this application.

FIG. 12 is a schematic structural diagram of a network device in this application. As shown in FIG. 12, the network device may include a processing module 21 and a receiving module 22. The receiving module 22 is coupled to the processing module 21, and the processing module 21 controls a receiving action of the receiving module 22. Optionally, the network device may further include a sending module 23 coupled to the processing module 21. The processing module 21 controls a sending action of the sending module 23.

The receiving module 22 is configured to receive first information sent by a terminal device, where the first information is used to indicate a first channel quality indicator CQI corresponding to a first block error rate.

The receiving module 22 is further configured to receive second information sent by the terminal device by using radio resource control RRC signaling or media access control MAC signaling, where the second information is used to indicate a difference between the first CQI and a second CQI, the second CQI is a CQI corresponding to a second block error rate, and the first block error rate is greater than the second block error rate.

Further, the processing module 21 is configured to: after the receiving module 22 receives the second information sent by the terminal device by using the radio resource control RRC signaling or the media access control MAC signaling, determine the second CQI based on the first information and the second information, and instruct, based on the first CQI and the second CQI, the sending module 23 to send data to the terminal device. For example, the processing module 21 is specifically configured to: after instructing the sending module 23 to initially transmit data to the terminal device by using a first modulation and coding scheme MCS corresponding to the first CQI, instruct, when a difference between a largest latency allowed by the terminal device and a current latency is greater than a first preset threshold, the sending module 23 to retransmit the data to the terminal device by using the first MCS, or instruct, when a difference between a largest latency allowed by the terminal device and a current latency is less than or equal to a preset threshold, the sending module 23 to retransmit the data to the terminal device by using a second MCS corresponding to the second CQI. Alternatively, the processing module 21 is specifically configured to: when a largest latency allowed by the terminal device is less than or equal to a second preset threshold, instruct the sending module 23 to initially transmit and retransmit data to the terminal device, by using a second MCS corresponding to the second CQI.

Optionally, when the second information includes the difference between the first CQI and the second CQI, the processing module 21 is specifically configured to determine the second CQI based on the first CQI and the difference between the first CQI and the second CQI.

Optionally, when the second information includes a transmission parameter currently used by the terminal device, the processing module 21 is specifically configured to: determine the difference between the first CQI and the second CQI based on the transmission parameter and a correspondence between the transmission parameter and the difference between the first CQI and the second CQI, and determine the second CQI based on the first CQI and the difference between the first CQI and the second CQI. The transmission parameter is in the one-to-one correspondence with the difference between the first CQI and the second CQI. The transmission parameter described herein may include one or more of the following: a reliability indicator of a currently transmitted service, a transmission mode, a quantity of receive antenna ports, a Doppler frequency shift, and a signal-to-noise ratio.

In this case, in this implementation, the receiving module 22 is further configured to: before receiving the second information sent by the terminal device by using the radio resource control RRC signaling or the media access control MAC signaling, receive third information sent by the terminal device, where the third information is used to indicate the correspondence between the transmission parameter and the difference between the first CQI and the second CQI.

The network device provided in this application may perform actions on a network device side in the foregoing method embodiments shown in FIG. 3, FIG. 4, FIG. 5, and FIG. 6. Implementation principles and technical effects of the network device are similar to those in the foregoing method embodiments. Details are not described herein again.

Figure 13:
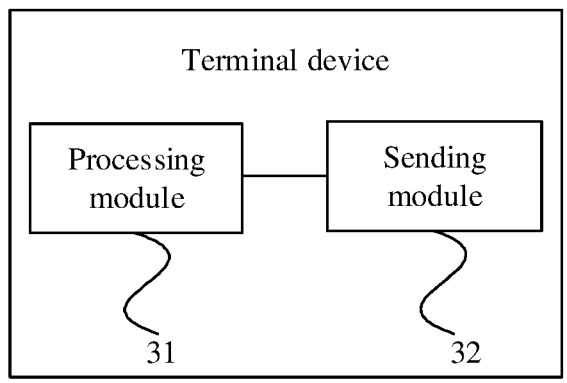
FIG. 13 is a schematic structural diagram of another terminal device in this application.

FIG. 13 is a schematic structural diagram of another terminal device in this application. As shown in FIG. 13, the terminal device may include a processing module 31 and a sending module 32. The sending module 32 is coupled to the processing module 31, and the processing module 31 controls a sending action of the sending module 32.

The sending module 32 is configured to send first information to a network device, where the first information is used to indicate a first maximum quantity of retransmissions that is corresponding to a first block error rate.

The sending module 32 is further configured to send second information to the network device, where the second information is used to indicate a difference between the first maximum quantity of retransmissions and a second maximum quantity of retransmissions, the second maximum quantity of retransmissions is a maximum quantity of retransmissions that is corresponding to a second block error rate, and the first block error rate is greater than the second block error rate.

The terminal device provided in this application may perform actions on a terminal device side in the foregoing method embodiment shown in FIG. 10. Implementation principles and technical effects of the terminal device are similar to those in the foregoing method embodiment. Details are not described herein again.

It should be noted that it should be understood that the sending module may be a transmitter in actual implementation, and the receiving module may be a receiver in actual implementation. The processing module may be implemented in a form of software invoked by using a processing element, or may be implemented in a form of hardware. For example, the processing module may be a processing element disposed separately, or may be integrated into a chip of the foregoing apparatus for implementation. In addition, the processing module may be stored in a memory of the foregoing apparatus in a form of program code, and is invoked by a processing element of the foregoing apparatus to perform a function of the processing module. In addition, all or some of these modules may be integrated together or may be independently implemented. The processing element herein may be an integrated circuit and has a signal processing capability. In an implementation process, the steps in the foregoing methods or the foregoing modules may be implemented by using a hardware integrated logical circuit in the processor element or by using instructions in a form of software.

For example, these modules may be one or more integrated circuits configured to implement the foregoing methods, for example, one or more application-specific integrated circuits (ASIC), one or more microprocessors (digital signal processor, DSP), or one or more field programmable gate arrays (FPGA). For another example, when one of the foregoing modules is implemented in a form of a processing element scheduling program code, the processing element may be a general purpose processor, for example, a central processing unit (CPU) or another processor that can invoke the program code. For another example, these modules may be integrated together and implemented in a form of a system-on-a-chip (SOC).

Figure 14:
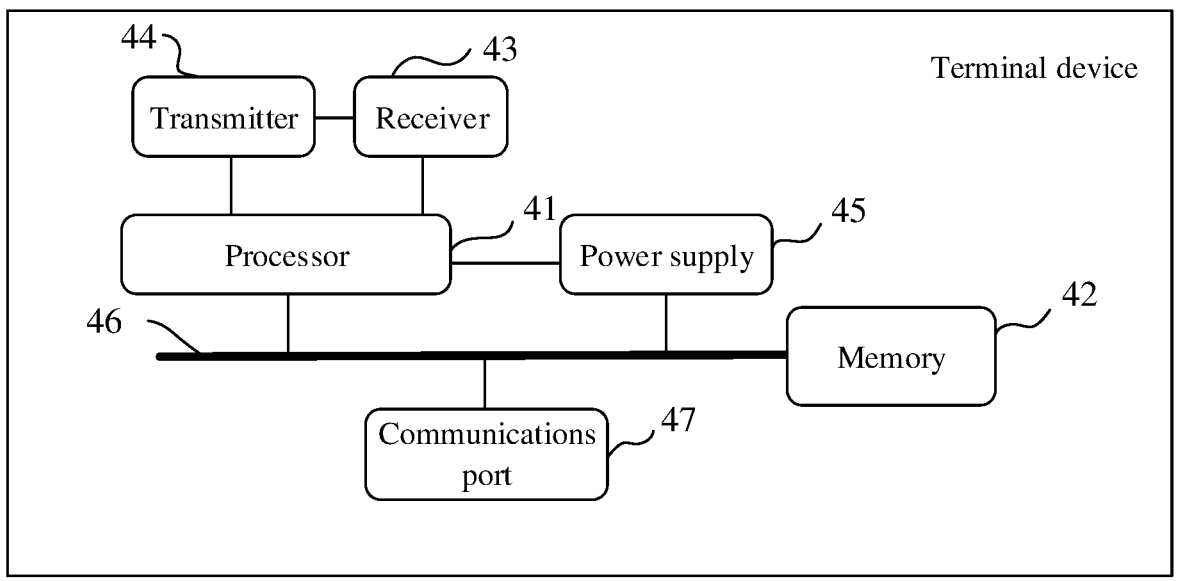
FIG. 14 is a schematic structural diagram of still another terminal device in this application.

FIG. 14 is a schematic structural diagram of still another terminal device in this application. As shown in FIG. 14, the terminal device may include a processor 41 (for example, a CPU) and a transmitter 44. The transmitter 44 is coupled to the processor 41, and the processor 41 controls a sending action of the transmitter 44. Optionally, the terminal device in this application may further include a memory 42, a receiver 43, a power supply 45, a communications bus 46, and a communications port 47. The memory 42 may include a high-speed RAM memory, or may include a nonvolatile memory NVM, for example, at least one magnetic disk memory. The memory 42 may store various instructions to complete various processing functions and implement steps of the methods in this application. The receiver 43 and the transmitter 44 may be integrated into a transceiver of the terminal device, or may be an independent transceiver antenna on the terminal device. The communications bus 46 is configured to implement communication connection between elements. The communications port 47 is configured to implement connection and communication between the terminal device and another peripheral.

In this application, the memory 42 is configured to store computer executable program code, where the program code includes an instruction. When the processor 41 executes the instruction, the instruction enables the processor 41 to control the transmitter 44 to perform the foregoing method embodiments. Details are as follows:

The transmitter 44 is configured to send first information to a network device, where the first information is used to indicate a first channel quality indicator CQI corresponding to a first block error rate.

The transmitter 44 is further configured to send second information to the network device by using radio resource control RRC signaling or media access control MAC signaling, where the second information is used to indicate a difference between the first CQI and a second CQI, the second CQI is a CQI corresponding to a second block error rate, and the first block error rate is greater than the second block error rate. Optionally, a sending period of the second information is greater than or equal to a sending period of the first information.

Optionally, the second information may include the difference between the first CQI and the second CQI.

Optionally, in an implementation of this application, the second information includes a transmission parameter currently used by the terminal device, and the transmission parameter is in a one-to-one correspondence with the difference between the first CQI and the second CQI. The transmission parameter may include one or more of the following: a reliability indicator of a currently transmitted service, a transmission mode, a quantity of receive antenna ports, a Doppler frequency shift, a signal-to-noise ratio, and the like.

In this case, in this implementation, the transmitter 44 is further configured to: before sending the second information to the network device by using the radio resource control RRC signaling or the media access control MAC signaling, send third information to the network device, where the third information is used to indicate the correspondence between the transmission parameter and the difference between the first CQI and the second CQI.

In this case, in this implementation, the processor 31 is configured to: when the transmission parameter of the terminal device changes, instruct the transmitter 44 to send the second information to the network device by using the RRC signaling or the MAC signaling.

The terminal device provided in this application may perform actions on a terminal device side in the foregoing method embodiments shown in FIG. 3, FIG. 5, and FIG. 6. Implementation principles and technical effects of the terminal device are similar to those in the foregoing method embodiments. Details are not described herein again.

Figure 15:
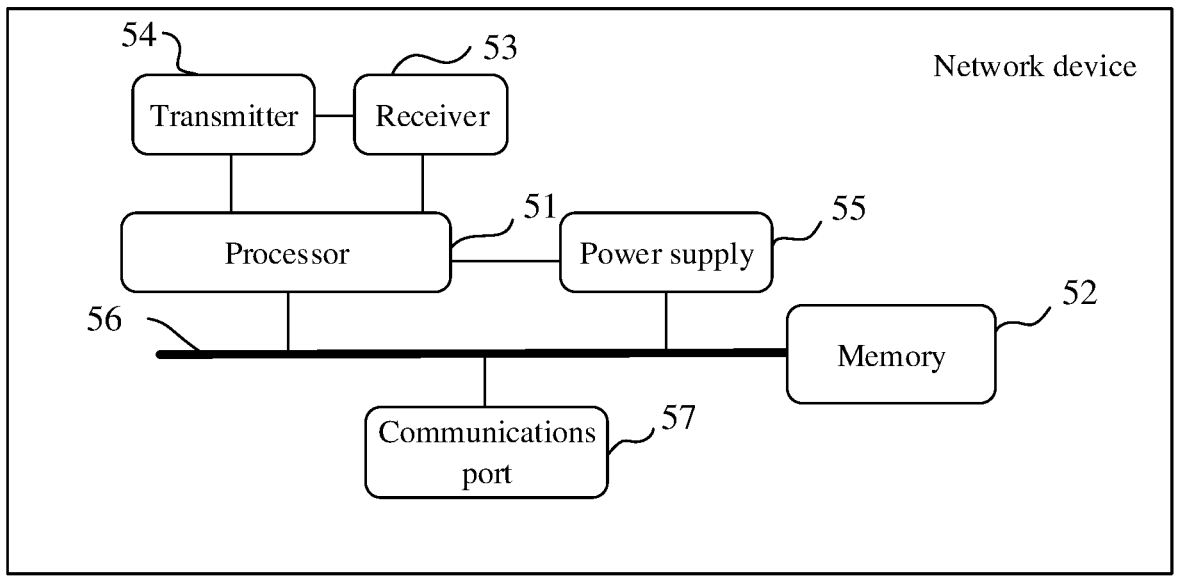
FIG. 15 is a schematic structural diagram of another network device in this application.

FIG. 15 is a schematic structural diagram of another network device in this application. As shown in FIG. 15, the network device may include a processor 51 (for example, a CPU) and a receiver 53. The receiver 53 is coupled to the processor 51, and the processor 51 controls a receiving action of the receiver 53. Optionally, the network device in this application may further include a memory 52, a transmitter 54, a power supply 55, a communications bus 56, and a communications port 57. The memory 52 may include a high-speed RAM memory, or may include a nonvolatile memory NVM, for example, at least one magnetic disk memory. The memory 52 may store various instructions to complete various processing functions and implement steps of the methods in this application. The receiver 53 and the transmitter 55 may be integrated into a transceiver of the network device, or may be an independent transceiver antenna on the network device. The communications bus 56 is configured to implement communication connection between elements. The communications port 57 is configured to implement connection and communication between the network device and another peripheral.

In this application, the memory 52 is configured to store computer executable program code, where the program code includes an instruction. When the processor 51 executes the instruction, the instruction enables the processor 51 to control the receiver 53 and the transmitter 54 to perform the foregoing method embodiments. Details are as follows:

The receiver 53 is configured to receive first information sent by a terminal device, where the first information is used to indicate a first channel quality indicator CQI corresponding to a first block error rate.

The receiver 53 is further configured to receive second information sent by the terminal device by using radio resource control RRC signaling or media access control MAC signaling, where the second information is used to indicate a difference between the first CQI and a second CQI, the second CQI is a CQI corresponding to a second block error rate, and the first block error rate is greater than the second block error rate.

Further, the processor 51 is configured to: after the receiver 53 receives the second information sent by the terminal device by using the radio resource control RRC signaling or the media access control MAC signaling, determine the second CQI based on the first information and the second information, and instruct, based on the first CQI and the second CQI, the transmitter 54 to send data to the terminal device. For example, the processor 51 is specifically configured to: after instructing the transmitter 54 to initially transmit data to the terminal device by using a first modulation and coding scheme MCS corresponding to the first CQI, instruct, when a difference between a largest latency allowed by the terminal device and a current latency is greater than a first preset threshold, the transmitter 54 to retransmit the data to the terminal device by using the first MCS, or instruct, when a difference between a largest latency allowed by the terminal device and a current latency is less than or equal to a preset threshold, the transmitter 54 to retransmit the data to the terminal device by using a second MCS corresponding to the second CQI. Alternatively, the processor 51 is specifically configured to: when a largest latency allowed by the terminal device is less than or equal to a second preset threshold, instruct the transmitter 54 to initially transmit and retransmit data to the terminal device, by using a second MCS corresponding to the second CQI.

Optionally, when the second information includes the difference between the first CQI and the second CQI, the processor 51 is specifically configured to determine the second CQI based on the first CQI and the difference between the first CQI and the second CQI.

Optionally, when the second information includes a transmission parameter currently used by the terminal device, the processor 51 is specifically configured to: determine the difference between the first CQI and the second CQI based on the transmission parameter and a correspondence between the transmission parameter and the difference between the first CQI and the second CQI, and determine the second CQI based on the first CQI and the difference between the first CQI and the second CQI. The transmission parameter is in the one-to-one correspondence with the difference between the first CQI and the second CQI. The transmission parameter described herein may include one or more of the following: a reliability indicator of a currently transmitted service, a transmission mode, a quantity of receive antenna ports, a Doppler frequency shift, and a signal-to-noise ratio.

In this case, in this implementation, the receiver 53 is further configured to: before receiving the second information sent by the terminal device by using the radio resource control RRC signaling or the media access control MAC signaling, receive third information sent by the terminal device, where the third information is used to indicate the correspondence between the transmission parameter and the difference between the first CQI and the second CQI.

The network device provided in this application may perform actions on a network device side in the foregoing method embodiments shown in FIG. 3, FIG. 4, FIG. 5, and FIG. 6. Implementation principles and technical effects of the network device are similar to those in the foregoing method embodiments. Details are not described herein again.

Figure 16:
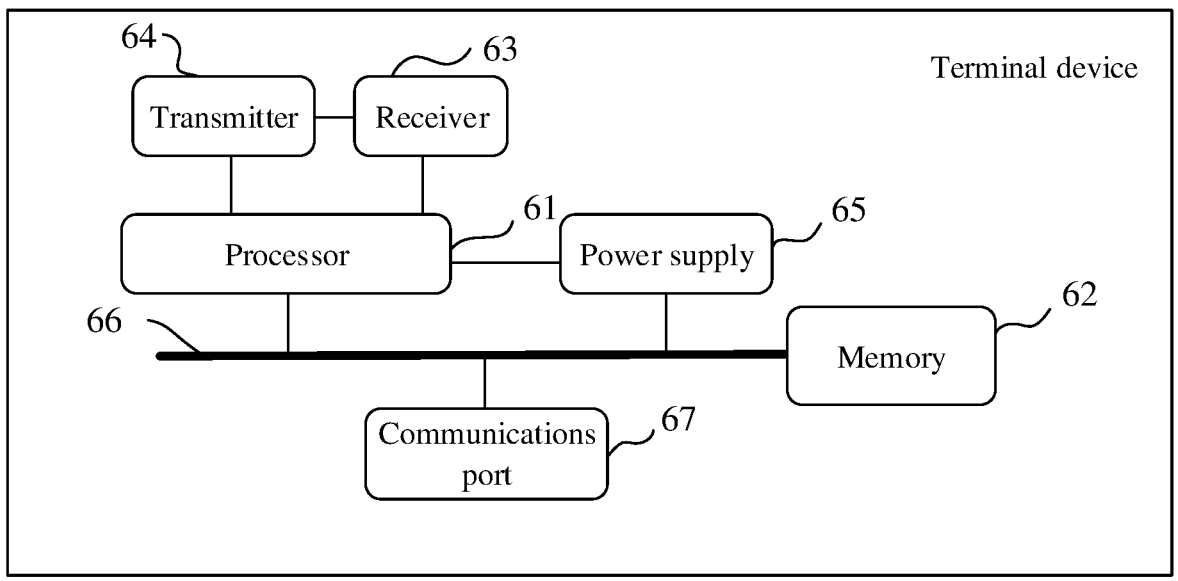
FIG. 16 is a schematic structural diagram of still another terminal device in this application.

FIG. 16 is a schematic structural diagram of still another terminal device in this application. As shown in FIG. 16, the terminal device may include a processor 61 (for example, a CPU) and a transmitter 64. The transmitter 64 is coupled to the processor 61, and the processor 61 controls a sending action of the transmitter 64. Optionally, the terminal device in this application may further include a memory 62, a receiver 63, a power supply 65, a communications bus 66, and a communications port 67. The memory 62 may include a high-speed RAM memory, or may include a nonvolatile memory NVM, for example, at least one magnetic disk memory. The memory 62 may store various instructions to complete various processing functions and implement steps of the methods in this application. The receiver 63 and the transmitter 64 may be integrated into a transceiver of the terminal device, or may be an independent transceiver antenna on the terminal device. The communications bus 66 is configured to implement communication connection between elements. The communications port 67 is configured to implement connection and communication between the terminal device and another peripheral.

In this application, the memory 62 is configured to store computer executable program code, where the program code includes an instruction. When the processor 61 executes the instruction, the instruction enables the processor 61 to control the transmitter 64 to perform the foregoing method embodiments. Details are as follows:

The transmitter 64 is configured to send first information to a network device, where the first information is used to indicate a first maximum quantity of retransmissions that is corresponding to a first block error rate.

The transmitter 64 is further configured to send second information to the network device, where the second information is used to indicate a difference between the first maximum quantity of retransmissions and a second maximum quantity of retransmissions, the second maximum quantity of retransmissions is a maximum quantity of retransmissions that is corresponding to a second block error rate, and the first block error rate is greater than the second block error rate.

The terminal device provided in this application may perform actions on a terminal device side in the foregoing method embodiment shown in FIG. 10. Implementation principles and technical effects of the terminal device are similar to those in the foregoing method embodiment. Details are not described herein again.

Figure 17:
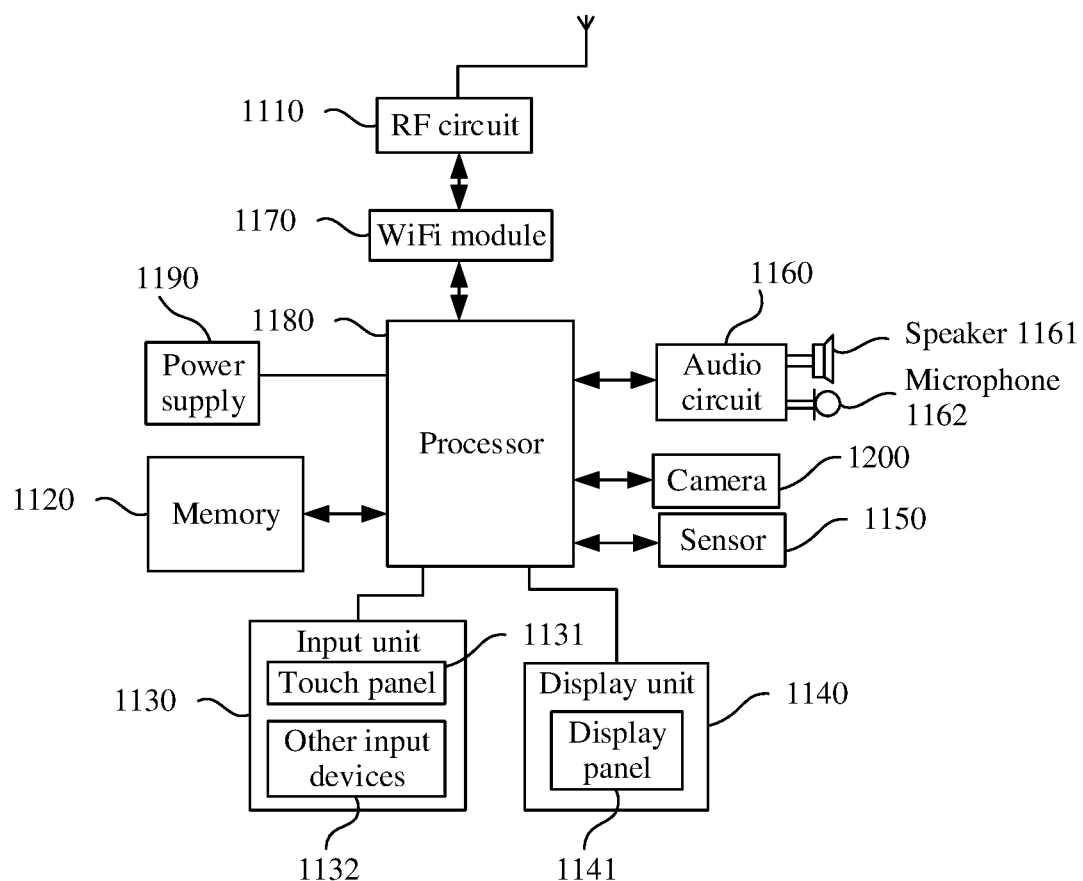
FIG. 17 is a block diagram of a structure obtained when a terminal device is a mobile phone in this application.

As described in the foregoing embodiments, the terminal device in this application may be a wireless terminal such as a mobile phone or a tablet computer. Therefore, for example, the terminal device is a mobile phone. FIG. 17 is a block diagram of a structure obtained when a terminal device is a mobile phone in this application. Referring to FIG. 17, the mobile phone may include components such as a radio frequency (RF) circuit 1110, a memory 1120, an input unit 1130, a display unit 1140, a sensor 1150, an audio circuit 1160, a wireless fidelity (WiFi) module 1170, a processor 1180, and a power supply 1190. A person skilled in the art may understand that the structure of the mobile phone shown in FIG. 17 constitutes no limitation on the mobile phone. The mobile phone may include more or fewer components than those shown in the figure, or combine some components, or have different component arrangements.

The following describes the composition components of the mobile phone in detail with reference to FIG. 17.

The RF circuit 1110 may be configured to: receive and send a signal in an information receiving/transmitting process or a call process, for example, after receiving downlink information from a base station, send the downlink information to the processor 1180 for processing; and in addition, send uplink data to the base station. Generally, the RF circuit includes but is not limited to an antenna, at least one amplifier, a transceiver, a coupler, a low noise amplifier (LNA), a duplexer, and the like. In addition, the RF circuit 1110 may further communicate with a network and another device through wireless communication. The wireless communication may use any communications standard or protocol, including but not limited to a global system for mobile communications (GSM), a general packet radio service (GPRS), code division multiple access (CDMA), wideband code division multiple access (WCDMA), long term evolution (LTE), an email, a short message service (SMS), and the like.

The memory 1120 may be configured to store a software program and a module, and the processor 1180 performs various function applications of the mobile phone and data processing by running the software program and the module that are stored in the memory 1120. The memory 1120 may mainly include a program storage area and a data storage area. The program storage area may store an operating system, an application program required by at least one function (such as a sound playing function and an image playing function), and the like, and the data storage area may store data (such as audio data and an address book) created based on use of the mobile phone, and the like. In addition, the memory 1120 may include a high-speed random access memory, or may include a nonvolatile memory, such as at least one magnetic disk storage device, a flash device, or another volatile solid-state storage device.

The input unit 1130 may be configured to: receive input number or character information, and generate key signal input related to user setting and function control of the mobile phone. Specifically, the input unit 1130 may include a touch panel 1131 and other input devices 1132. The touch panel 1131, also referred to as a touchscreen, can collect a touch operation (for example, an operation performed by a user on the touch panel 1131 or near the touch panel 1131 by using any proper object or accessory, such as a finger or a stylus) performed by the user on or near the touch panel 1131, and drive a corresponding connection apparatus based on a preset program. Optionally, the touch panel 1131 may include two parts: a touch detection apparatus and a touch controller. The touch detection apparatus detects a touch orientation of the user, detects a signal brought by the touch operation, and sends the signal to the touch controller. The touch controller receives touch information from the touch detection apparatus, converts the touch information into contact coordinates, then sends the contact coordinates to the processor 1180, and can receive and execute a command sent by the processor 1180. In addition, the touch panel 1131 may be implemented in a plurality of types, such as a resistive type, a capacitive type, infrared, and a surface acoustic wave. In addition to the touch panel 1131, the input unit 1130 may further include the other input devices 1132. Specifically, the other input devices 1132 may include but are not limited to one or more of a physical keyboard, a function key (such as a volume control key or an on/off key), a trackball, a mouse, a joystick, and the like.

The display unit 1140 may be configured to display information entered by the user or information provided for the user, and various menus of the mobile phone. The display unit 1140 may include a display panel 1141. Optionally, the display panel 1141 may be configured in a form, such as a liquid crystal display (LCD) and an organic light-emitting diode (OLED). Further, the touch panel 1131 may cover the display panel 1141. After detecting the touch operation on or near the touch panel 1131, the touch panel 1131 sends the touch operation to the processor 1180 to determine a type of a touch event, and then the processor 1180 provides corresponding visual output on the display panel 1141 based on the type of the touch event. In FIG. 10, the touch panel 1131 and the display panel 1141 serve as two independent components to implement input and input functions of the mobile phone; however, in some embodiments, the touch panel 1131 and the display panel 1141 may be integrated to implement the input and output functions of the mobile phone.

The mobile phone may further include at least one sensor 1150, such as a light sensor, a motion sensor, and another sensor. Specifically, the light sensor may include an ambient light sensor and a proximity sensor. The ambient light sensor may adjust brightness of the display panel 1141 based on luminance of ambient light, and the light sensor may disable the display panel 1141 and/or backlight, when the mobile phone approaches an ear. As a motion sensor, an acceleration sensor may detect a value of acceleration in each direction (generally, three axes), may detect a value and a direction of gravity in a static state, and may be configured to identify an application of a mobile phone posture (such as switching between a landscape and a portrait, a related game, and magnetometer posture calibration), a function related to vibration identification (such as a pedometer or a strike), and the like. Other sensors such as a gyroscope, a barometer, a hygrometer, a thermometer, and an infrared sensor may be further configured in the mobile phone. Details are not described herein.

The audio circuit 1160, a speaker 1161, and a microphone 1162 may provide an audio interface between the user and the mobile phone. The audio circuit 1160 may convert received audio data into an electrical signal, and transmit the electrical signal to the speaker 1161, and the speaker 1161 converts the electrical signal into a voice signal for output. In addition, the microphone 1162 converts a collected voice signal into an electrical signal, and the audio circuit 1160 receives the electrical signal, converts the electrical signal into audio data, and then outputs the audio data to the processor 1180 for processing, to send the audio data to, for example, another mobile phone by using the RF circuit 1110, or output the audio data to the memory 1120 for further processing.

WiFi belongs to a short-range wireless transmission technology. The mobile phone may help, by using the WiFi module 1170, the user receive and send emails, browse a web page, access streaming media, and the like. The WiFi module 1170 provides wireless broadband Internet access for the user. Although FIG. 17 shows the WiFi module 1170, it may be understood that the WiFi module 1170 is not a mandatory component of the mobile phone, and may be omitted based on a requirement without changing the essence scope of this application.

The processor 1180 is a control center of the mobile phone, is connected to each part of the entire mobile phone by using various interfaces and lines, and performs various functions of the mobile phone and data processing by running or executing the software program and/or the module that are/is stored in the memory 1120 and invoking data stored in the memory 1120, to perform overall monitoring on the mobile phone. Optionally, the processor 1180 may include one or more processing units. For example, the processor 1180 may integrate an application processor and a modem processor. The application processor mainly processes an operating system, a user interface, an application program, and the like, and the modem processor mainly processes wireless communication. It may be understood that the modem processor may not be integrated into the processor 1180.

The mobile phone further includes the power supply 1190 (for example, a battery) that supplies power to each component. Optionally, the power supply may be logically connected to the processor 1180 by using a power management system, to manage functions such as charging, discharging, and power consumption by using the power management system.

The mobile phone may further include a camera 1200. The camera may be a front-facing camera or a rear-facing camera. Although not shown in the figure, the mobile phone may further include a Bluetooth module, a GPS module, and the like. Details are not described herein.

In this application, the processor 1180 included in the mobile phone may be configured to perform the foregoing embodiments of the data transmission method. Implementation principles and technical effects of the processor 1180 are similar to those in the foregoing embodiments. Details are not described herein again.

All or some of the foregoing embodiments may be implemented by using software, hardware, firmware, or any combination thereof. When being implemented by using software, all or some of the foregoing embodiments may be implemented in a form of a computer program product. The computer program product includes one or more computer instructions. When the computer program instructions are loaded and executed on a computer, all or some of procedures or functions are generated according to the embodiments of the present invention. The computer may be a general-purpose computer, a dedicated computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

What is claimed is:

1. A data transmission method comprising:
   sending, by a terminal device, first information to a network device, wherein the first information is used to indicate a first channel quality indicator (CQI) corresponding to a first block error rate;
   sending, by the terminal device, third information to the network device, before sending second information, the second information comprising a transmission parameter currently used by the terminal device and indicating a difference between the first CQI and a second CQI, wherein the third information is used to indicate a correspondence between the transmission parameter and the difference between the first CQI and the second CQI; and
   sending, by the terminal device, the second information to the network device by using radio resource control (RRC) signaling or media access control (MAC) signaling, wherein the second CQI is a CQI corresponding to a second block error rate, and the first block error rate is greater than the second block error rate.

2. The method according to claim 1, wherein the second information comprises the difference between the first CQI and the second CQI.

3. The method according to claim 1, wherein the transmission parameter is in a one-to-one correspondence with the difference between the first CQI and the second CQI.

4. The method according to claim 3, wherein the transmission parameter comprises: a reliability indicator of a currently transmitted service, a transmission mode, a quantity of receive antenna ports, a Doppler frequency shift, or a signal-to-noise ratio.

5. The method according to claim 3, wherein sending the second information comprises:
   when the transmission parameter of the terminal device changes, sending, by the terminal device, the second information to the network device by using the RRC signaling or the MAC signaling.

6. The method according to claim 1, wherein a sending period of the second information is greater than or equal to a sending period of the first information.

7. A terminal device comprising:
   a processor;
   a memory storing a program to be executed in the processor;
   a transmitter coupled to the processor, the program comprising instructions that cause the processor to control a sending action of the transmitter to perform a method comprising;

sending first information to a network device, wherein the first information is used to indicate a first channel quality indicator (CQI) corresponding to a first block error rate;

sending third information to the network device, before sending second information, the second information comprising a transmission parameter currently used by the terminal device and indicating a difference between the first CQI and a second CQI, wherein the third information is used to indicate a correspondence between the transmission parameter and the difference between the first CQI and the second CQI; and sending the second information to the network device by using radio resource control (RRC) signaling or media access control (MAC) signaling, wherein the second CQI is a CQI corresponding to a second block error rate, and the first block error rate is greater than the second block error rate.

8. The terminal device according to claim 7, wherein the second information comprises the difference between the first CQI and the second CQI.

9. The terminal device according to claim 7, wherein the transmission parameter is in a one-to-one correspondence with the difference between the first CQI and the second CQI.

10. The terminal device according to claim 9, wherein the transmission parameter comprises: a reliability indicator of a currently transmitted service, a transmission mode, a quantity of receive antenna ports, a Doppler frequency shift, or a signal-to-noise ratio.

11. The terminal device according to claim 9, wherein the program comprises further instructions that further cause the processor to: when the transmission parameter of the terminal device changes, instruct the transmitter to send the second information to the network device by using the RRC signaling or the MAC signaling.

12. The terminal device according to claim 7, wherein a sending period of the second information is greater than or equal to a sending period of the first information.

13. A non-transitory computer readable medium storing a program to be executed by a processor, the program including instructions for:

sending first information to a network device, wherein the first information is used to indicate a first channel quality indicator (CQI) corresponding to a first block error rate;

sending third information to the network device, before sending second information, the second information comprising a transmission parameter, currently used by a terminal device having a processor executing the program, and indicating a difference between the first CQI and a second CQI, wherein the third information is used to indicate a correspondence between the transmission parameter and the difference between the first CQI and the second CQI; and sending the second information to the network device by using radio resource control (RRC) signaling or media access control (MAC) signaling, wherein the second CQI is a CQI corresponding to a second block error rate, and the first block error rate is greater than the second block error rate.

14. The non-transitory computer readable medium storing a program according to claim 13, wherein the second information comprises the difference between the first CQI and the second CQI.

15. The non-transitory computer readable medium storing a program according to claim 13, wherein the transmission parameter is in a one-to-one correspondence with the difference between the first CQI and the second CQI.

16. The non-transitory computer readable medium storing a program according to claim 15, wherein the transmission parameter comprises: a reliability indicator of a currently transmitted service, a transmission mode, a quantity of receive antenna ports, a Doppler frequency shift, or a signal-to-noise ratio.

17. The non-transitory computer readable medium storing a program according to claim 15, wherein the program comprises further instructions that further cause the processor to: when the transmission parameter of the terminal device changes, send the second information to the network device by using the RRC signaling or the MAC signaling.

18. The non-transitory computer readable medium storing a program according to claim 13, wherein a sending period of the second information is greater than or equal to a sending period of the first information.

* * * * *